United States Patent
Keereweer et al.

(10) Patent No.: US 12,440,600 B2
(45) Date of Patent: *Oct. 14, 2025

(54) BIOCOMPATIBLE, FLEXIBLE, HAEMOSTATIC SHEET

(71) Applicant: GATT TECHNOLOGIES B.V., Nijmegen (NL)

(72) Inventors: Abraham Reinier Keereweer, Nijmegen (NL); Rosa Pilar Félix Lanao, Nijmegen (NL); Joost Opsteen, Nijmegen (NL); Johannes Caspar Mathias Elizabeth Bender, Nijmegen (NL)

(73) Assignee: CILAG GMBH INTERNATIONAL, Zug (CH)

( * ) Notice: Subject to any disclaimer, the term of this patent is extended or adjusted under 35 U.S.C. 154(b) by 307 days.

This patent is subject to a terminal disclaimer.

(21) Appl. No.: 17/573,537

(22) Filed: Jan. 11, 2022

(65) Prior Publication Data

US 2022/0133947 A1     May 5, 2022

Related U.S. Application Data

(63) Continuation of application No. PCT/EP2020/069441, filed on Jul. 9, 2020.

(30) Foreign Application Priority Data

Jul. 12, 2019 (EP) ..................... 19186036
Jan. 14, 2020 (EP) ..................... 20151779

(51) Int. Cl.
    *A61L 24/00*      (2006.01)
    *A61L 15/64*      (2006.01)
    *C08L 79/02*      (2006.01)

(52) U.S. Cl.
CPC ....... *A61L 24/0073* (2013.01); *A61L 24/0042* (2013.01); *C08L 79/02* (2013.01); *A61L 15/64* (2013.01); *A61L 2400/04* (2013.01); *C08L 2205/22* (2013.01); *C08L 2312/00* (2013.01)

(58) Field of Classification Search
None
See application file for complete search history.

(56) References Cited

U.S. PATENT DOCUMENTS

| | | | |
|---|---|---|---|
| 6,733,845 B1 | 5/2004 | Caramaro et al. | |
| 7,435,425 B2 | 10/2008 | Qian et al. | |
| 8,545,871 B2 | 10/2013 | Arthur et al. | |
| 8,815,832 B2 | 8/2014 | Wang et al. | |
| 2003/0064109 A1 | 4/2003 | Qian et al. | |
| 2006/0062768 A1 | 3/2006 | Hnojewyj | |
| 2008/0312315 A1 | 12/2008 | Daniloff et al. | |
| 2010/0233246 A1 | 9/2010 | Sehl et al. | |
| 2011/0045034 A1 | 2/2011 | Nur et al. | |
| 2011/0250257 A1 | 10/2011 | Arthur et al. | |
| 2011/0251574 A1* | 10/2011 | Hedrich | A61P 17/02 604/368 |
| 2012/0021058 A1 | 1/2012 | Goessl | |
| 2013/0096063 A1 | 4/2013 | Hedrich et al. | |
| 2013/0129710 A1 | 5/2013 | Nordhaus et al. | |
| 2013/0316974 A1 | 11/2013 | Wang et al. | |
| 2013/0337036 A1 | 12/2013 | Arthur et al. | |
| 2014/0336147 A1 | 11/2014 | Berman et al. | |
| 2015/0010612 A1 | 1/2015 | Vogt et al. | |
| 2015/0045507 A1 | 2/2015 | Bender et al. | |
| 2015/0151020 A1 | 6/2015 | Kageyama et al. | |
| 2016/0250013 A1 | 9/2016 | Skalla et al. | |
| 2016/0271228 A1 | 9/2016 | Gulle et al. | |
| 2018/0221531 A1 | 8/2018 | Bender et al. | |
| 2019/0374673 A1 | 12/2019 | Hoefinghoff et al. | |
| 2022/0023484 A1 | 1/2022 | Yang et al. | |
| 2022/0133943 A1 | 5/2022 | Keereweer et al. | |

FOREIGN PATENT DOCUMENTS

| | | |
|---|---|---|
| CN | 1273862 A | 11/2000 |
| CN | 101594890 A | 12/2009 |
| CN | 101978040 A | 2/2011 |
| CN | 102361655 A | 2/2012 |

(Continued)

OTHER PUBLICATIONS 6-page brochure for Gelita Tuf-It by Southmedic with a copyright date of 2024.*
Boerman et al., "Next Generation Hemostatic Materials Based on NHS-Ester Functionalized Poly(2-oxazoline)s", Biomacromolecules, vol. 18, No. 8, Jul. 12, 2017, pp. 2529-2538.
International Search Report and Written Opinion for PCT Appl. Ser. No. PCT/EP2020/069441 dated Oct. 1, 2020 (11 pages).
Lewis et al., "Control of bleeding in surgical procedures: critical appraisal of Hemopatch (Sealing Hemostat)", Dove Press Journal, Medical Devices: Evidence and Research 2016, vol. 9, Dec. 22, 2015, pp. 1-10.

(Continued)

*Primary Examiner* — Tae H Yoon

(74) *Attorney, Agent, or Firm* — Foley & Lardner LLP; Sunit Talapatra

(57) ABSTRACT

Biocompatible, flexible, haemostatic sheets are provided comprising a water-resistant cohesive fibrous carrier structure comprising a three-dimensional interconnected interstitial space and fibres comprising a nucleophilic polymer carrying reactive nucleophilic groups; and distributed within the interstitial space throughout the fibrous carrier structure, a plurality of reactive polymer particles comprising a water-soluble electrophilic polymer carrying at least three reactive electrophilic groups that are capable of reacting with both amine groups in tissue and blood and with the reactive nucleophilic groups of the nucleophilic polymer to form covalent bonds, wherein the reactive polymer particles have a diameter between 0.5-100 μm and are present in an amount of at least 3% by weight of the fibrous carrier structure.

29 Claims, No Drawings

(56) References Cited

FOREIGN PATENT DOCUMENTS

| | | | |
|---|---|---|---|
| CN | 102802683 A | 11/2012 |
| CN | 103429268 A | 12/2013 |
| CN | 103957949 A | 7/2014 |
| CN | 104271638 A | 1/2015 |
| CN | 105407931 A | 3/2016 |
| CN | 105727346 A | 7/2016 |
| CN | 106215217 A | 12/2016 |
| CN | 106390177 A | 2/2017 |
| CN | 107106719 A | 8/2017 |
| CN | 108404199 A | 8/2018 |
| CN | 109310803 A | 2/2019 |
| CN | 109646710 A | 4/2019 |
| GB | 2543307 A * | 4/2017 |
| JP | 2001-521834 A | 11/2001 |
| JP | 2005-253830 A | 9/2005 |
| JP | 2006-523113 A | 10/2006 |
| JP | 2010-520377 A | 6/2010 |
| JP | 4875804 B2 * | 2/2012 |
| JP | 2012-509139 A | 4/2012 |
| JP | 2013-523296 A | 6/2013 |
| JP | 2013-526368 A | 6/2013 |
| JP | 2014-503017 A | 2/2014 |
| JP | 2014-533988 A | 12/2014 |
| JP | 2015-511507 A | 4/2015 |
| JP | 2017-008315 A | 1/2017 |
| JP | 2017-531488 A | 10/2017 |
| KR | 20170066450 A | 6/2017 |
| RU | 2593755 C2 | 8/2016 |
| WO | WO-98/12274 A1 | 3/1998 |
| WO | WO 2004/087227 A1 * | 10/2004 |
| WO | WO 2006/078282 A2 * | 7/2006 |
| WO | WO-2010/059280 A2 | 5/2010 |
| WO | WO-2011/124640 A1 | 10/2011 |
| WO | WO 2012/057628 A2 * | 5/2012 |
| WO | WO-2013/053759 A2 | 4/2013 |
| WO | WO 2014/190038 A2 * | 11/2014 |
| WO | WO-2016/056901 A1 | 4/2016 |
| WO | WO-2021/009014 A1 | 1/2021 |

OTHER PUBLICATIONS

Schuhmacher et al., "Safety and effectiveness of a synthetic hemostatic patch for intraoperative soft tissue bleeding", Dove Press Journal, Medical Devices: Evidence and Research 2015, vol. 8, Mar. 31, 2015, pp. 167-174.

* cited by examiner

BIOCOMPATIBLE, FLEXIBLE, HAEMOSTATIC SHEET

CROSS-REFERENCE TO RELATED APPLICATIONS

The present application is a Continuation of International Patent Application No. PCT/EP2020/069441, filed Jul. 9, 2020, which claims priority to European Patent Application No. 19186036.0 filed Jul. 12, 2019; and to European Patent Application No. 20151779.4 filed Jan. 14, 2020, the entire contents of all of which are hereby incorporated by reference.

TECHNICAL FIELD OF THE INVENTION

The present invention relates to a biocompatible, flexible, haemostatic sheet that can suitably be used to minimise haemorrhage during surgical procedures. This haemostatic sheet comprises:
- a water-resistant cohesive fibrous carrier structure comprising a three-dimensional interconnected interstitial space, said fibrous carrier structure comprising fibres containing a nucleophilic polymer carrying reactive nucleophilic groups; and
- distributed within the interstitial space, reactive polymer particles comprising a water-soluble electrophilic polymer carrying at least three reactive electrophilic groups, said reactive electrophilic groups being capable of reacting with amine groups in tissue and blood, as well as with reactive nucleophilic groups of the nucleophilic polymer, under the formation of a covalent bond.

BACKGROUND OF THE INVENTION

One of the main challenges during surgical procedures on parenchymatous tissue is to attain control over bleeding. Suture control, electrocautery, and ultrasonic sealing often do not suffice during operations on, for example, liver or kidneys. As a result, procedures like hepatic resections or partial nephrectomy require an alternative approach to control bleeding. For this purpose, a wide range of topical haemostatic products has been developed and are clinically available.

Lewis et al. (*Control of bleeding in surgical procedures: critical appraisal of HEMOPATCH (Sealing Hemostat)*, Dove Press Journal: Medical Devices Evidence and Research, 22 Dec. 2015, 1-9) describe a haemostatic pad (HEMOPATCH) that is composed of a synthetic, protein-reactive monomer and a collagen backing. The active side is covered with the protein-reactive monomer: N-hydroxysuccinimide functionalized polyethylene glycol (NHS-PEG). NHS-PEG rapidly affixes the collagen pad to tissue to promote and maintain hemostasis.

Schuhmacher et al. (*Safety and effectiveness of a synthetic hemostatic patch for intraoperative soft tissue bleeding*, Med Devices (Auckl). 2015; 8: 167-174) describe a hemostatic patch (Veriset™) that is composed of an absorbable backing material, oxidized cellulose and polyethylene glycol hydrogel. Veriset™ hemostatic patch is provided as a ready-to-use patch that is applied polyethylene glycol-side down to the bleeding site.

Boerman et al. (*Next Generation Hemostatic Materials Based on NHS-Ester Functionalized Poly(2-oxazoline)s*, Biomacromolecules (2017), 18, 2529-2538) describe a synthetic, nonbioactive hemostatic product that is obtained by coating N-hydroxysuccinimide ester (NHS)-functional poly(2-oxazoline)s (NHS-POx) onto gelatin patches, which acts by formation of covalent cross-links between polymer, host blood proteins, gelatin and tissue to seal the wound site and prevent haemorrhage during surgery.

US 2010/0233246 describes a biocompatible polymer device comprising a collagen sponge or sheet impregnated with a two-part reactive polyethylene glycol powder, wherein said reactive powder comprises a first polyethylene glycol having nucleophilic groups and a second polyethylene glycol having electrophilic groups, wherein the polyethylene glycol powder remains unreactive in the dry state.

WO 2010/059280 describes an anhydrous fibrous sheet comprising a first component of fibrous polymer, said polymer containing electrophilic groups or nucleophilic groups, and a second component capable of crosslinking the first component when said sheet is exposed to an aqueous medium in contact with biological tissue to form a crosslinked hydrogel that is adhesive to the biological tissue; wherein:
a) wherein the second component is a fibrous polymer having a backbone structure the same as or different from the fibrous polymer of the first component and containing electrophilic groups if the first component contains nucleophilic groups or containing nucleophilic groups if the first component contains electrophilic groups;
b) the second component is a coating on the fibrous polymer of the first component and wherein said coating contains electrophilic groups if the first component contains nucleophilic groups or nucleophilic groups if the first component contains electrophilic groups; or
c) the second component is a dry powder dispersed and entrapped within interstices of the fibrous polymer of the first component, wherein said powder contains electrophilic groups if the first component contains nucleophilic groups or nucleophilic groups if the first component contains electrophilic groups.

US 2011/0250257 describes an anhydrous fibrous sheet comprising a first component of fibrous polymer, said polymer containing electrophilic groups or nucleophilic groups, and a second component capable of crosslinking the first component when said sheet is exposed to an aqueous medium in contact with biological tissue to form a crosslinked hydrogel that is adhesive to the biological tissue; wherein the second component is a fibrous polymer and containing electrophilic groups if the first component contains nucleophilic groups or containing nucleophilic groups if the first component contains electrophilic groups; or the second component is a coating on the fibrous polymer of the first component, wherein said coating contains electrophilic groups if the first component contains nucleophilic groups or nucleophilic groups if the first component contains electrophilic groups; or the second component is a dry powder dispersed and entrapped within interstices of the fibrous polymer of the first component, wherein said powder contains electrophilic groups if the first component contains nucleophilic groups or nucleophilic groups if the first component contains electrophilic groups.

WO 2011/124640 describes a method of manufacturing a hemostatic sponge comprising:
a) providing a sponge comprising a matrix of a biomaterial in dried form,
b) providing one reactive polymeric material in the form of dry powder,
c) contacting a) and b) so that the material of b) is present on at least one surface of said sponge, and
d) fixing the material of b) on the sponge of a).

Fixation can be achieved by melting for a sufficiently long time period.

WO 2012/057628 describes a tissue-adhesive medical product comprising at least 1% by weight of dry matter of an electrophilically activated polyoxazoline (EL-POx), said EL-POx comprising at least 2 reactive electrophilic groups, including at least one pendant electrophilic group. Besides EL-POx, the medical product may contain a nucleophilically activated polyoxazoline (NU-POx). Examples of tissue-adhesive products include adhesive tissue tape, tissue sealant, haemostatic porous material and implants.

WO 2016/056901 describes an adhesive haemostatic product selected from a coated mesh, a coated foam or a coated powder, said haemostatic product comprising:
- a porous solid substrate having a porosity of at least 5 vol. % and comprising an outer surface that comprises a nucleophilic polymer containing reactive nucleophilic groups;
- an adhesive coating that covers at least a part of the solid substrate, said coating comprising an electrophilically activated polyoxazoline (EL-POx), said EL-POx containing on average at least 1 reactive electrophilic group.

The adhesive haemostatic product is produced by a process comprising the steps of providing a porous solid substrate; coating the substrate with a coating liquid that comprises EL-POx and a solvent; and removing the solvent.

SUMMARY OF THE INVENTION

The inventors have developed a biocompatible, flexible, haemostatic sheet that is particularly suited for preventing haemorrhage during laparoscopic surgical procedures.

The haemostatic sheet according to the present invention comprises a water-resistant cohesive fibrous carrier structure that holds small particles comprising a reactive electrophilic polymer that is capable of covalently binding with host blood proteins and tissue as well as with reactive nucleophilic groups in the fibrous carrier structure, and which thereby induces haemostatis and/or tissue-adhesion. Thus, one aspect of the invention relates to a biocompatible, flexible, haemostatic sheet comprising:
- a water-resistant cohesive fibrous carrier structure comprising a three-dimensional interconnected interstitial space, said fibrous carrier structure comprising fibres containing a nucleophilic polymer carrying reactive nucleophilic groups; and
- distributed within the interstitial space, a plurality of reactive polymer particles comprising a water-soluble electrophilic polymer carrying at least three reactive electrophilic groups that are capable of reacting with amine groups in tissue and blood, as well as with reactive nucleophilic groups of the nucleophilic polymer, under the formation of a covalent bond, said reactive polymer particles having a diameter in the range of 0.5-100 μm and being present in an amount of at least 3% by weight of the fibrous carrier structure.

The haemostatic sheet of the present invention comprises a water-resistant cohesive fibrous carrier structure that readily absorbs blood as blood can penetrate the interstitial space. This fibrous carrier structure can easily be impregnated with reactive polymer particles. Unlike impregnation with liquids, such dry impregnation does not affect the structural integrity or mechanical properties of the carrier structure. When blood is absorbed by the haemostatic sheet of the present invention, the reactive polymer particles within the sheet start dissolving as soon as they are 'wetted' by the blood, thereby allowing the electrophilic polymer to react with both reactive nucleophilic groups in the blood and tissue and reactive nucleophilic groups in the fibrous carrier structure, thereby inducing blood coagulation and tissue sealing, both of which contribute to haemostasis.

Although the inventors do not wish to be bound by theory, it is believed that the advantageous properties of the haemostatic sheet of the present invention can be attributed to the fact that the reactive polymer particles are distributed throughout the fibrous carrier structure creating a minimum of bending friction and also to the fact that, due to the small particles size, these reactive polymer particles dissolve rapidly when they come into contact with blood or other aqueous bodily fluids. Thus, upon application of the sheet onto a wound site, rapid covalent cross-linking occurs between on the one hand the reactive electrophilic polymer and on the other hand blood proteins, tissue and the fibrous carrier structure, leading to the formation of a gel which seals off the wound surface and stops the bleeding and which can provide strong adhesion of the fibrous sheet to the tissue. The water-resistant fibrous carrier structure provides mechanical strength during and after application, and prevents excessive swelling.

Due to its flexibility, the haemostatic sheet of the present invention can suitably be applied to irregularly shaped bleeding sites. The haemostatic sheet may be applied layer on layer if an already applied sheet does not fully stop the bleeding.

Another aspect of the present invention relates to a method of preparing a haemostatic sheet, said method comprising:
- providing a sheet of water-resistant cohesive fibrous carrier structure as defined above;
- providing reactive polymer particles as defined above; and
- distributing the reactive polymer particles within the interstitial space of the fibrous carrier structure.

DETAILED DESCRIPTION OF THE INVENTION

Accordingly, one aspect of the invention relates to a biocompatible, flexible, haemostatic sheet comprising:
- a water-resistant cohesive fibrous carrier structure comprising a three-dimensional interconnected interstitial space, said fibrous carrier structure comprising fibres containing a nucleophilic polymer carrying reactive nucleophilic groups; and
- distributed within the interstitial space, a plurality of reactive polymer particles comprising a water-soluble electrophilic polymer carrying at least three reactive electrophilic groups that are capable of reacting with amine groups in tissue and blood, as well as with reactive nucleophilic groups of the nucleophilic polymer, under the formation of a covalent bond, said reactive polymer particles having a diameter in the range of 0.5-100 μm and being present in an amount of at least 3% by weight of the fibrous carrier structure.

The term "haemostatic sheet" as used herein, unless indicated otherwise, refers to a sheet having the ability to stop bleeding from damaged tissue. The haemostatic sheet of the present invention may achieve haemostasis by turning blood into a gel and/or by forming a seal that closes off the wound site.

The term "tissue-adhesive" as used herein refers to the ability of the haemostatic sheet to cling to tissue due to the formation of covalent bonds between the sheet and the tissue. Formation of these covalent bonds typically requires the presence of water.

The term "water-resistant" as used herein in relation to the fibrous carrier structure means that this structure is not water soluble and does not disintegrate in water to form a colloidal dispersion, at neutral pH conditions (pH 7) and a temperature of 37° C.

The term "interstitial space" as used herein refers to the void ("empty") space within the fibrous carrier structure. The interstitial space within the fibrous carrier structure allows the introduction of reactive polymer particles into the structure. Also blood and other bodily fluids can enter the interstitial space, allowing the water-soluble electrophilic polymer within the reactive polymer particles to dissolve.

The concentration of reactive polymer particles having a diameter in the range of 0.5-100 μm is expressed in % by weight of the fibrous carrier structure per se, i.e. without the reactive polymer particles.

The "water-soluble electrophilic polymer carrying reactive electrophilic groups" that is employed in accordance with the present invention carries at least three reactive groups that are capable of reacting with amine groups in tissue and blood under the formation of a covalent bond. This water-soluble electrophilic polymer has a molecular weight of at least 1 kDa and a solubility in distilled water of 20° C. of at least 50 g/L.

The term "water absorption capacity" as used herein is a measure of the capability of the haemostatic sheet to absorb water. The water absorption capacity is determined by weighing a sample of the dry sheet (weight=$W_d$) followed by immersion of the sample into distilled water (37° C.) for 45 minutes. Next, the sample is removed from the water and water clinging to the outside of the substrate is removed, following which the sample is weighed again (weight=$W_w$). The water absorption capacity=$100\% \times (W_w-W_d)/W_d$. The water adsorption capacity is indicative of the porosity of the substrate as well as of its ability to swell in the presence of water.

The term "collagen" as used herein refers the main structural protein in the extracellular space of various connective tissues in animal bodies. Collagen forms a characteristic triple helix of three polypeptide chains. Depending upon the degree of mineralization, collagen tissues may be either rigid (bone) or compliant (tendon) or have a gradient from rigid to compliant (cartilage). Unless indicated otherwise, the term "collagen" also encompasses modified collagens other than gelatin.

The term "gelatin" as used herein refers to a mixture of peptides and proteins produced by partial hydrolysis of collagen extracted from the skin, bones, and connective tissues of animals such as domesticated cattle, chicken, pigs, and fish. During hydrolysis, the natural molecular bonds between individual collagen strands are broken down into a form that rearranges more easily.

The term "polyoxazoline" as used herein refers to a poly(N-acylalkylenimine) or a poly(aroylalkylenimine) and is further referred to as POx. An example of POx is poly(2-ethyl-2-oxazoline). The term "polyoxazoline" also encompasses POx copolymers.

The reactive polymer particles may be homogeneously distributed within the interstitial space of the fibrous carrier structure in the sense that the particle density is essentially the same throughout the carrier structure. The reactive polymer particles may also be unevenly distributed throughout the carrier structure. For instance, if the haemostatic sheet is prepared in the form of a laminate of thin layers of fibrous carrier structure and layers of reactive polymer particles, the reactive polymer particle density within the sheet may fluctuate. For certain applications it may be advantageous if the reactive polymer particle density shows a gradient, e.g. in that the density of reactive particles is lowest near the side of the sheet that is meant to applied onto a bleeding wound and highest near the other side of the sheet.

The diameter distribution of the reactive polymer particles may suitably be determined by means of laser diffraction using a Malvern Mastersizer 2000 in combination with the Stainless Steel Sample Dispersion Unit. The sample dispersion unit is filled with approx. 120 ml of cyclohexane, which is stabilized for 5 to 10 minutes at a stirring speed of 1800 rpm, followed by a background measurement (blanc measurement). The sample tube is shaken and turned horizontally for 20 times. Next, about 50 mg is dispersed in the sample dispersion unit containing the cyclohexane. After the sample is introduced in the dispersion unit, the sample is stirred for one and a half minute at 1800 rpm to ensure that all particles are properly dispersed, before carrying out the measurement. No ultrasonic treatment is performed on the dispersed particles. Mean particle size is expressed as D [4,3], the volume weighted mean diameter $(\Sigma n_i D_i^4)/(\Sigma n_i D_i^3)$.

In a particularly preferred embodiment, unlike the fibrous tissue sealant described in US 2011/0250257, the haemostatic sheet of the present invention does not form a hydrogel, i.e. a water-swellable polymeric matrix that can absorb a substantial amount of water to form an elastic gel.

According to a particularly preferred embodiment, the haemostatic sheet of the present invention is bioabsorbable, meaning that the carrier structure, the reactive polymer particles and any other components of the haemostatic sheet are eventually absorbed in the body. Absorption of the carrier structure and reactive polymer particles typically requires chemical decomposition (e.g. hydrolysis) of polymers contained therein.

Complete bioabsorption of the haemostatic sheet by the human body is typically achieved in 1 to 10 weeks, preferably in 2 to 8 weeks.

The haemostatic sheet of the present invention typically has a non-compressed mean thickness of 0.5-25 mm. More preferably, the non-compressed mean thickness is in the range of 1-10 mm, most preferably in the range of 1.5-5 mm.

The dimensions of the haemostatic sheet preferably are such that the top and bottom of the sheet each have a surface area of at least 2 $cm^2$, more preferably of at least 10 $cm^2$ and most preferably of 25-50 $cm^2$. Typically, the sheet is rectangular in shape and has a length of 25-200 mm, an a width of 25-200 mm.

The haemostatic sheet preferably has a non-compressed density of less than 200 mg/$cm^3$, more preferably of less than 150 mg/$cm^3$ and most preferably of 10-100 mg/$cm^3$.

In one embodiment of the invention the reactive polymer particles are homogeneously distributed within the interstitial space of the fibrous carrier structure. In another embodiment of the invention the haemostatic sheet is a laminate comprising alternating layers of fibrous carrier structure and layers of the reactive polymer particles. In the latter embodiment, reactive polymer particles preferably have entered the layers of fibrous carrier structure that separate the layers of reactive polymer particles.

The haemostatic sheet of the present invention preferably is essentially anhydrous. Typically, the haemostatic sheet has a water content of not more than 5 wt. %, more preferably of not more than 2 wt. % and most preferably of not more than 1 wt. %.

The water absorption capacity of the haemostatic sheet preferably is at least 50%, more preferably lies in the range of 100% to 800%, most preferably in the range of 200% to 500%.

The haemostatic sheet of the present invention is preferably sterile.

The reactive polymer particles in the haemostatic sheet preferably comprise a water-soluble electrophilic polymer that carries reactive electrophilic groups selected from carboxylic acid esters, sulfonate esters, phosphonate esters, pentafluorophenyl esters, p-nitrophenyl esters, p-nitrothiophenyl esters, acid halide groups, anhydrides, ketones, aldehydes, isocyanato, thioisocyanato, isocyano, epoxides, activated hydroxyl groups, olefins, glycidyl ethers, carboxyl, succinimidyl esters, sulfo succinimidyl esters, maleimido (maleimidyl), ethenesulfonyl, imido esters, aceto acetate, halo acetal, orthopyridyl disulfide, dihydroxy-phenyl derivatives, vinyl, acrylate, acrylamide, iodoacetamide and combinations thereof. More preferably, the reactive electrophilic groups are selected from carboxylic acid esters, sulfonate esters, phosphonate esters, pentafluorophenyl esters, p-nitrophenyl esters, p-nitrothiophenyl esters, acid halide groups, anhyinidrides, ketones, aldehydes, isocyanato, thioisocyanato, isocyano, epoxides, activated hydroxyl groups, glycidyl ethers, carboxyl, succinimidyl esters, sulfo succinimidyl esters, imido esters, dihydroxy-phenyl derivatives, and combinations thereof. Even more preferably, the reactive electrophilic groups are selected from halo acetals, orthopyridyl disulfide, maleimides, vinyl sulfone, dihydroxyphenyl derivatives, vinyl, acrylate, acrylamide, iodoacetamide, succinimidyl esters and combinations thereof. Most preferably, the reactive electrophilic groups are selected from maleimides, vinyl, acrylate, acrylamide, succinimidyl esters, sulfo succinimidyl esters and combinations thereof.

Examples of succinimidyl esters that may be employed include succinimidyl glutarate, succinimidyl propionate, succinimidyl succinamide, succinimidyl carbonate, disuccinimidyl suberate, bis(sulfosuccinimidyl) suberate, dithiobis(succinimidylpropionate), bis(2-succinimidooxycarbonyloxy)ethyl sulfone, 3,3'-dithiobis(sulfosuccinimidylpropionate), succinimidyl carbamate, sulfosuccinimidyl(4-iodoacetyl)aminobenzoate, bis(sulfosuccinimidyl) suberate, sulfosuccinimidyl-4-(N-maleimidomethyl)-cyclohexane-1-carboxylate, dithiobis-sulfosuccinimidyl propionate, disulfo-succinimidyl tartarate; bis[2-(sulfo-succinimidyloxy-carbonyloxyethylsulfone)], ethylene glycol bis(sulfosuccinimiclylsuccinate), dithiobis-(succinimidyl propionate).

Examples of dihydroxyphenyl derivatives that may be employed include dihydroxyphenylalanine, 3,4-dihydroxyphenylalanine (DOPA), dopamine, 3,4-dihydroxyhydroccinamic acid (DOHA), norepinephrine, epinephrine and catechol.

The use of a fibrous carrier structure in the haemostatic sheet of the present invention offers the advantage that the reactive polymer particles can be homogeneously distributed throughout this carrier structure without difficulty. Such a homogeneous distribution is much more difficult to achieve in, for instance, foamed carrier structures.

The fibres in the fibrous carrier structure preferably have a mean diameter of 1-500 µm, more preferably of 2-300 µm and most preferably of 5-200 µm. The mean diameter of the fibres can suitably be determined using a microscope.

Typically, at least 50 wt. %, more preferably at least 80 wt. % of the fibres in the fibrous carrier structure have a diameter of 1-300 µm and a length of at least 1 mm.

Preferably, at least 50 wt. %, more preferably at least 80 wt. % of the fibres in the fibrous carrier structure have an aspect ratio (ratio of length to diameter) of at least 1000.

The fibrous carrier structure that is employed in accordance with the present invention preferably is a felt structure, a woven structure or a knitted structure. Most preferably, the fibrous carrier structure is a felt structure. Here the term "felt structure" refers to a structure that is produced by matting and pressing fibres together to form a cohesive material.

According to a particularly preferred embodiment, the fibrous carrier structure is biodegradable.

The nucleophilic polymer that is contained in the fibrous carrier structure may be homogenously distributed throughout fibres that are contained in the carriers structure or it may be applied as an external coating layer. The presence of nucleophilic polymer in the carrier structure improves both adhesion and haemostatic properties of the haemostatic sheet.

Preferably, the fibres of the fibrous carrier structure contain at least 5 wt. %, more preferably at least 10 wt. % and more preferably at least 50 wt. % of the nucleophilic polymer. Most preferably, the fibres consist of said nucleophilic polymer.

The nucleophilic polymer that is contained in fibres of the carrier structure typically contains at least 2 reactive nucleophilic groups, more preferably at least 5 reactive nucleophilic groups, even more preferably at least 10 reactive nucleophilic groups, most preferably at least 20 reactive nucleophilic groups.

These reactive nucleophilic groups are preferably selected from amine groups, thiol groups, phosphine groups and combinations thereof. More preferably, these reactive nucleophilic groups are selected from amine groups, thiol groups and combinations thereof. Most preferably, the reactive nucleophilic groups are amine groups. These amine groups are preferably selected from primary amine groups, secondary amine groups and combinations thereof.

The nucleophilic polymer in the fibres of the fibrous carrier structure preferably has a nitrogen content of at least 1 wt. %, more preferably of 5-10 wt. % and most preferably of 15-25 wt. %.

The nucleophilic polymer is preferably selected from protein, chitosan, synthetic polymer carrying reactive nucleophilic groups, carbohydrate polymers carrying reactive nucleophilic groups and combinations thereof. More preferably, the nucleophilic polymer is selected from gelatin, collagen, chitosan and combinations thereof. Even more preferably, the nucleophilic polymer is gelatin, most preferably cross-linked gelatin.

Chitosan is a biodegradable, nontoxic, complex carbohydrate derivative of chitin (poly-N-acetyl-D-glucosamine), a naturally occurring substance. Chitosan is the deacetylated form of chitin. The chitosan applied in accordance with the present invention preferably has a degree of deacetylation of more than 70%.

The fibrous carrier structure preferably comprises at least 50 wt. %, more preferably at least 80 wt. % and most preferably at least 90 wt. % fibres containing a nucleophilic polymer carrying reactive nucleophilic groups.

In a preferred embodiment, the fibrous carrier structure comprises at least 50 wt. %, more preferably at least 80 wt.

% and most preferably at least 90 wt. % fibres containing at least 50 wt. % of a nucleophilic polymer carrying reactive nucleophilic groups.

According to a particularly preferred embodiment, the fibrous carrier structure comprises at least 50 wt. %, more preferably at least 80 wt. % and most preferably at least 90 wt. % fibres made from gelatin, collagen or chitosan.

Preferred collagens do not possess telopeptide regions ("atelopeptide collagen"). The collagen employed in accordance with the present invention is preferably selected from the group of microfibrillar collagen, synthetic human collagen such as the type I collagen, type III collagen, or a combination of type I collagen and type III collagen. Collagen crosslinked using heat, radiation, or chemical agents such as glutaraldehyde may also be used.

In accordance with a preferred embodiment, the fibres in the fibrous carrier structure comprise at least 50 wt. %, more preferably at least 80 wt. % and most preferably at least 90 wt. % gelatin. The gelatin in the fibres preferably has a Bloom strength of 200 or more.

In a particularly advantageous embodiment, the fibrous carrier structure comprises at least 50 wt. %, more preferably at least 80 wt. % and most preferably at least 90 wt. % of partially cross-linked gelatin. The use of partially cross-linked gelatin offers the advantage that the fibrous carrier structure is both sufficiently stable and flexible at body temperature, and that swelling of the fibrous carrier structure does not result in the formation of a closed-pore fibrous gel structure.

In the preparation of the haemostatic sheet of the present invention, it can be advantageous to react a fraction of the reactive electrophilic groups in the electrophilic polymer of the of the reactive polymer particles with the reactive nucleophilic groups of the nucleophilic polymer. Thus, the reactive polymer particles may be fixated effectively within the fibrous carrier structure.

According to a preferred embodiment, the reactive nucleophilic groups of the nucleophilic polymer in the fibres of the fibrous carrier structure include amine groups and the reactive electrophilic groups of the electrophilic polymer in the reactive polymer particles are selected from carboxylic acid esters, sulfonate esters, phosphonate esters, pentafluorophenyl esters, p-nitrophenyl esters, p-nitrothiophenyl esters, acid halide groups, anhydrides, ketones, aldehydes, isocyanato, thioisocyanato, isocyano, epoxides, activated hydroxyl groups, glycidyl ethers, carboxyl, succinimidyl esters, sulfosuccinimidyl esters, imido esters, dihydroxyphenyl derivatives, and combinations thereof.

According to another preferred embodiment, the reactive nucleophilic groups of nucleophilic polymer include thiol groups and the reactive electrophilic groups of the electrophilic polymer in the reactive polymer particles are selected from halo acetals, orthopyridyl disulfide, maleimides, vinyl sulfone, dihydroxyphenyl derivatives, vinyl, acrylate, acrylamide, iodoacetamide, succinimidyl esters, sulfosuccinimidyl esters and combinations thereof. More preferably, the reactive electrophilic groups are selected from succinimidyl esters, sulfosuccinimidyl esters, halo acetals, maleimides, or dihydroxyphenyl derivatives and combinations thereof. Most preferably, the reactive electrophilic groups are selected from maleimides or dihydroxyphenyl derivatives and combinations thereof.

In a preferred embodiment of the invention, the fibrous carrier structure does not comprise oxidised regenerated cellulose.

Preferred fibrous carrier structures have an open pore structure with a permeability to air of at least 0.1 L/min× $cm^2$, more preferably of at least 0.5 L/min×$cm^2$.

The air permeability is determined in accordance with EN ISO 9237:1995 (Textiles—Determination of the permeability of fabrics to air).

The fibres in the fibrous carrier structure can be produced by means of methods known in the art, such as electrospinning, electro-blown spinning and high speed rotary sprayer spinning. Production of fibrous carrier structure by means of high speed rotary sprayer spinning is described in US 2015/0010612. It is also possible to use commercially available haemostatic fibrous sheets as the fibrous carrier structure. An examples of a suitable commercial product is GELITA TUFT-IT® (ex Gelita Medical).

The reactive polymer particles are preferably present in the haemostatic sheet of the present invention in an amount of 5-90%, more preferably 10-80%, even more preferably 20-75% and most preferably 50-70%, by weight of the fibrous carrier structure.

The reactive polymer particles preferably contain at least 10 wt. % of the water-soluble electrophilic polymer. More preferably, the reactive polymer particles contain at least 50 wt. %, more preferably at least 90 wt. % of the water-soluble electrophilic polymer.

The reactive polymer particles that are distributed within the interstitial space of the fibrous carrier structure preferably have a volume weighted mean particle size in the range of 2-75 µm, more preferably in the range of 1-50 µm and most preferably in the range of 1-25 µm.

The reactive polymer particles of the present invention may be prepared in various ways, e.g. by milling, by spray drying a polymeric solution, by freeze drying, by spray chilling a polymeric melt, by granulating a powder mixture, or by fluidised bed coating.

The water-soluble electrophilic polymer typically has a molecular weight of at least 2 kDa, more preferably of at least 5 kDa and most preferably of 10-100 kDa.

The water-soluble electrophilic polymer preferably has a solubility in distilled water of 20° C. of at least 100 g/L, more preferably of at least 200 g/L.

The water-soluble electrophilic polymer that is employed in accordance with the present invention, preferably contains at least 4 reactive electrophilic groups, more preferably at least 8 reactive electrophilic groups, even more preferably at least 16 reactive electrophilic groups and most preferably at least 32 reactive electrophilic groups.

The water-soluble electrophilic polymer that is present in the reactive polymer particles is preferably selected from polyoxazolines, polyethylene glycols, polyvinylpyrrolidones, polyurethanes (e.g. as described in WO 2017/171551) and combinations thereof. Even more preferably the electrophilic polymer is selected from polyoxazolines, polyethylene glycols and combinations thereof. Most preferably the electrophilic polymer is a polyoxazoline.

The polyoxazoline comprising reactive electrophilic groups is preferably derived from a polyoxazoline whose repeating units are represented by the following formula (I):

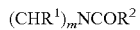

wherein $R^2$, and each of $R^1$ are independently selected from H, optionally substituted $C_{1-22}$ alkyl, optionally substituted cycloalkyl, optionally substituted aralkyl, optionally substituted aryl; and m being 2 or 3.

Preferably, $R^1$ and $R^2$ in formula (I) are selected from H and $C_{1-8}$ alkyl, even more preferably from H and $C_{1-4}$ alkyl. $R^1$ most preferably is H. The integer m in formula (I) is preferably equal to 2.

According to a preferred embodiment, the polyoxazoline is a polymer, even more preferably a homopolymer of 2-alkyl-2-oxazoline, said 2-alkyl-2-oxazoline being selected from 2-methyl-2-oxazoline, 2-ethyl-2-oxazoline, 2-propyl-2-oxazoline, 2-butyl-2-oxazoline and combinations thereof. Preferably, the polyoxazoline is a homopolymer of 2-propyl-2-oxazoline or 2-ethyl-oxazoline. Most preferably, the polyoxazoline is a homopolymer of 2-ethyl-oxazoline.

According to a particularly preferred embodiment, the water-soluble electrophilic polymer comprises at least 20 oxazoline units, more preferably at least 30 oxazoline units and most preferably at least 80 oxazoline units. The electrophilic polymer preferably comprises on average at least 0.05 reactive electrophilic groups per oxazoline residue. Even more preferably, the electrophilic polymer comprises on average at least 0.1 reactive electrophilic groups per oxazoline residue. Most preferably, the electrophilic polymer comprises on average 0.12-0.5 reactive electrophilic groups per oxazoline residue.

The water-soluble electrophilic polymer typically carries on average at least 10, more preferably at least 20 reactive electrophilic groups.

Polyoxazoline can carry reactive electrophilic groups in its side chains (pendant reactive electrophilic groups), at its termini, or both.

The polyoxazoline that is employed in accordance with the present invention advantageously contains one or more pendant reactive electrophilic groups. Typically, the polyoxazoline contains 0.03-0.5 pendant reactive electrophilic groups per monomer, more preferably 0.04-0.35 pendant reactive electrophilic groups per monomer, even more preferably 0.05-0.25 pendant reactive electrophilic groups per monomer.

The polyethylene glycol (PEG) comprising reactive electrophilic groups that is applied in accordance with the present invention preferably is a multi-arm PEG or a star PEG, comprising at least 3 arms, more preferably at least 4 arms terminated with a reactive electrophilic group.

Besides the water-soluble electrophilic polymer, the reactive polymer particles may suitably contain a polysaccharide selected from dextran, alginate, oxidized cellulose (including oxidized regenerated cellulose (ORC)), hydroxyethylcellulose, hydroxymethylcellulose, hyaluronic acid; and combinations thereof. Preferably, such a polysaccharide is contained in the reactive polymer particles in a concentration of at least 15 wt. %, more preferably of at least 25 wt. % and most preferably of at least 50 wt. %. In a particularly preferred embodiment the reactive polymer particles contain at least 25 wt. %, most preferably at least 50 wt. % of ORC.

In an advantageous embodiment of the present invention, besides the water-soluble electrophilic polymer, the reactive polymer particles additionally contain a nucleophilic cross-linking agent that contains at least two reactive nucleophilic groups that are capable of reacting with the reactive electrophilic groups of the other water-soluble polymer under the formation of a covalent bond, and optionally one or more polysaccharides. The introduction of a nucleophilic cross-linking agent offers the advantage that the haemostatic and adhesive properties of the sheet can be improved as the water-soluble electrophilic polymer will react with the nucleophilic cross-linking agent when blood, or more importantly, when bodily fluids containing a relative low amount of nucleophilic protein (for instance hepatic bile) enters the sheet. This cross-linking reaction will lead to the formation of a hydrogel that immobilizes the blood or bodily fluid flow and this hydrogel will stick to tissue due to the formation of covalent bonds between reactive electrophilic groups in the hydrogel and amine/thiol groups in the tissue. By combining the water-soluble electrophilic polymer and the nucleophilic cross-linking agent in a single particle, it is ensured that these two reactive components can be homogeneously distributed throughout the haemostatic sheet, that no segregation occurs during transport and handling, and that these components can react immediately with each other when the particles come into contact with blood or aqueous bodily fluids. Reactive polymer particles containing a combination of the water-soluble polymer carrying reactive electrophilic groups and a nucleophilic cross-linking agent, i.e. reactive hybrid particles, can be produced via wet granulation and subsequent drying, preferably under reduced pressure. The granulation liquid should be chosen such that little or no reactions occur during granulation between the water-soluble electrophilic polymer and the nucleophilic cross-linking agent. This may be achieved, for instance, by employing a granulation liquid in which at least one of these two components is insoluble. Most preferably, the water-soluble polymer carrying reactive electrophilic groups is insoluble in the granulation liquid.

According to a particularly preferred embodiment, the reactive polymer particles are particle agglomerates comprising: (i) electrophilic particles containing the water-soluble electrophilic polymer; and (ii) nucleophilic particles containing the nucleophilic cross-linking agent.

The electrophilic particles preferably contain at least 30 wt. %, more preferably at least 50 wt. % and most preferably at least 80 wt. % of the water-soluble electrophilic polymer.

The nucleophilic particles preferably contain at least 30 wt. %, more preferably at least 50 wt. % and most preferably at least 80 wt. % of the nucleophilic cross-linking agent.

Typically, the reactive hybrid particles according to this embodiment have the following composition:
 (a) 50-95 wt. % water-soluble electrophilic polymer carrying at least three reactive electrophilic groups;
 (b) 5-50 wt. % nucleophilic cross-linking agent;
 (c) 0-50 wt. % polysaccharide;
 wherein the combination of components (a) to (c) together constitute at least 80 wt. %, more preferably at least 90 wt. % of the reactive polymer particles. According to a particularly preferred embodiment, the water-soluble electrophilic polymer carrying reactive electrophilic groups that is employed in this embodiment is a polyoxazoline (EL-POx).

The reactive polymer particles preferably contain water-soluble electrophilic polymer and the nucleophilic cross-linking agent in such amounts that the ratio between the total number of reactive electrophilic groups provided by the water-soluble electrophilic polymer and the total number of reactive nucleophilic groups provided by the nucleophilic cross-linking agent lies in the range of 25:1 to 1:1, more preferably in the range of 18:1 to 2:1 and most preferably in the range of 12:1 to 2.5:1.

The nucleophilic cross-linking agent preferably contains at least 3 reactive nucleophilic groups, more preferably at least 5 reactive nucleophilic groups, even more preferably at least 10 reactive nucleophilic groups, most preferably at least 20 reactive nucleophilic groups.

The reactive nucleophilic groups of the nucleophilic cross-linking agent are preferably selected from amine groups, thiol groups, phosphine groups and combinations thereof, more preferably they are selected from amine groups, thiol groups and combinations thereof. Most preferably, these reactive nucleophilic groups are amine groups. According to a preferred embodiment, the reactive nucleophilic groups present in the nucleophilic cross-linking agent are primary amine groups.

The nucleophilic cross-linking agent preferably has a nitrogen content of at least 1 wt. %, more preferably of 5-10 wt. % and most preferably of 15-25 wt. %.

In one embodiment of the invention the nucleophilic cross-linking agent is a low molecular weight polyamine having a molecular weight of less than 1,000 g/mol, more preferably of less than 700 g/mol and most preferably of less than 400 g/mol. Examples of suitable low molecular weight polyamines include dilysine; trilysine; tetralysine; pentalysine; dicysteine; tricysteine; tetracysteine; pentacystein; oligopeptides comprising two or more amino acid residues selected from lysine, ornithine, cysteine, arginine and combinations thereof, and other amino acid residues; spermine; tris(aminomethyl)amine; arginine and combinations thereof.

According to another embodiment of the invention, the nucleophilic cross-linking agent is a high molecular weight (>1,000 g/mol) polyamine selected from the group of nucleophilically activated POx (NU-POx); amine-functionalised polyethylene glycol, chitosan; chitosan derivatives (e.g. dicarboxy-derivatised chitosan polymers as described in WO 2009/028965), polyethyleneimines; polyvinylamine; polyallyl amine; amine-functionalized poly(meth)acrylates; saccharides containing amine-functional moieties such as aminoglycosides; polypeptides comprising two or more amino acid residues selected from lysine, ornithine, cysteine, arginine and combinations thereof; and combinations thereof. Albumin of natural source or recombinant is an example of a polypeptide that may suitably be employed as a polypeptide. 4,6-disubstituted deoxystreptamine (Kanamycin A, Amikacin, Tobramycin, Dibekacin, Gentamicin, Sisomicin, Netilmicin), 4,5-di substituted deoxystreptamine (Neomycins B, C and Neomycin E (paromomycin)) and non-deoxystreptamine aminoglycosides, e.g. streptomycin, are examples of aminoglycosides that can be employed. Most preferably, the high molecular weight polyamine is NU-POx. In yet another embodiment of the invention the nucleophilic cross-linking agent employed in the reactive polymer particles is a low molecular weight polythiol comprising 2 or more thiol groups having a molecular weight of less than 1,000 g/mol, more preferably of less than 700 g/mol and most preferably of less than 400 g/mol. Even more preferably, the nucleophilic cross-linking agent is selected from the group of trimercaptopropane, ethanedithiol, propanedithiol, 2-mercaptoethyl ether, 2,2'-(ethylenedioxy)diethanethiol, tetra(ethylene glycol)dithiol, penta(ethylene glycol)dithiol, hexaethylene glycol dithiol; thiol modified pentaerythritol, dipentaerythritol, trimethylolpropane or ditrimethylolpropane; oligopeptides containing at least two cysteine units.

According to yet another embodiment of the invention, the nucleophilic cross-linking agent employed in the reactive polymer particles is a high molecular weight (>1,000 g/mol) polythiol selected from the group of: NU-POx comprising at least two thiol groups; thiol-functionalized poly(meth)acrylates; polysaccharides containing thiol-functional moieties, polypeptides comprising two or more thiol groups.

Preferably, the nucleophilic cross-linking agent is a high molecular weight polyamine selected from the group of nucleophilically activated POx (NU-POx); amine-functionalised polyethylene glycol, chitosan; chitosan derivatives, polyethyleneimines; polyvinylamine; polyallyl amine; amine-functionalized poly(meth)acrylates; saccharides containing amine-functional moieties; polypeptides comprising two or more amino acid residues selected from lysine, ornithine, cysteine, arginine and combinations thereof; and combinations thereof. More preferably, the nucleophilic cross-linking agent is selected from NU-POx; amine-functionalised polyethylene glycol; gelatin, collagen and combinations thereof. Most preferably, the high molecular weight polyamine is NU-POx.

The high molecular weight polyamine preferably comprise three or more amine groups, more preferably 10 or more amine groups, and most preferably 20 or more amine groups.

In a particularly preferred embodiment of the invention the reactive polymer particles contain 50-95 wt. % EL-POx and 5-50 wt. % NU-POx, more preferably 60-90 wt. % EL-POx and 10-40 wt. % NU-POx and most preferably 70-85 wt. % EL-POx and 15-30 wt. % NU-POx.

In accordance with another advantageous embodiment the reactive polymer particles contain a dry buffering system. Preferably, the buffering system has a buffering pH in the range of 7 to 11, more preferably in the range of 8 to 10.

Preferably, the buffering system has a buffer capacity of at least 10 mmol·l$^{-1}$·pH$^{-1}$. More preferably, the buffer capacity is a least 25 mmol·l$^{-1}$·pH$^{-1}$, most preferably the buffer capacity is at least 50 mmol·l$^{-1}$·pH$^{-1}$ The inventors have unexpectedly discovered that a haemostatic sheet having particularly desirable adhesive properties can be obtained by employing reactive polymer particles containing 1-20 wt. %, more preferably 2.5-15 wt. % and most preferably 5-10 wt. % of a non-reactive non-ionic polymer. This non-reactive non-ionic polymer does not contain reactive electrophilic groups or reactive nucleophilic groups.

In a very preferred embodiment, the reactive polymer particles are coated with the non-reactive non-ionic polymer.

The non-reactive non-ionic polymer preferably has a melting point in the range of 40-70° C., more preferably in the range of 45-65° C. and most preferably in the range of 50-60° C. Here the melting point refers to the temperature at which the polymer is completely melted.

Examples of non-reactive non-ionic polymers that may suitably be applied in the reactive polymer particles of the present invention include poloxamers, polyethylene glycols and combinations thereof. Poloxamer is a non-ionic triblock copolymer composed of a central hydrophobic chain of polyoxypropylene (poly(propylene oxide)) flanked by two hydrophilic chains of polyoxyethylene (poly(ethylene oxide)) and is represented by formula (I)

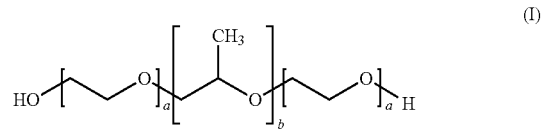

(I)

wherein a is an integer of from 10 to 110 and b is an integer of from 20 to 60. When a is 80 and b is 27, this polymer is known as poloxamer 188. Other known poloxamers useful in the present invention are poloxamer 237 (a=64; and b=37), poloxamer 338 (a=141; and b=44) and poloxamer 407 (a=101; and b=56). Further poloxamers that are known and can be useful in the present invention include poloxamer 108, poloxamer 182, poloxamer 183, poloxamer 212, poloxamer 217, poloxamer 238, poloxamer 288, poloxamer 331, poloxamer 338 and poloxamer 335.

According to a particularly preferred embodiment, the non-reactive non-ionic polymer is a poloxamer, even more preferably a poloxamer having an average molecular mass of 2,000-18,000, most preferably a poloxamer having an average molecular mass of 7,000-10,000. The poloxamer applied in the particle agglomerates preferably is a solid at room temperature.

Another aspect of the present invention relates to a sealed package containing one or more haemostatic sheets according to the present invention.

Yet another aspect of the invention relates to a method of preparing a haemostatic sheet, said method comprising:
- providing a sheet of water-resistant cohesive fibrous carrier structure as defined above;
- providing reactive polymer particles as defined above; and
- distributing the reactive polymer particles within the interstitial space of the fibrous carrier structure.

The reactive polymer particles may be distributed within the interstitial space using a dry method or a wet method, the dry method being preferred. In the dry method, the reactive polymer particles are applied in the form of a powder and this powder is dispersed in dry form through the interstitial space.

According to one preferred embodiment of this dry method, the reactive polymer particles are distributed within the interstitial space of the fibrous carrier structure by shaking or vibrating the sheet of fibrous carrier structure.

In accordance with another embodiment of the dry method, the haemostatic sheet is prepared by a lamination method comprising:
a) providing a sheet of fibrous carrier structure,
b) depositing a layer of the reactive polymer particles onto the sheet of fibrous carrier structure;
c) superimposing another sheet of fibrous carrier structure onto the layer of reactive polymer particles; and
optionally repeating steps b) and c) one or more times.

Distribution of the reactive polymer particles within the laminate so obtained may be promoted by shaking or vibration the laminate.

In the wet method of distributing reactive polymer particles, a dispersion of the reactive polymer particles in a low boiling organic liquid is used to impregnate the fibrous carrier structure, followed by evaporation of the low boiling organic liquid, preferably at reduced pressure. Typically, the low boiling organic liquid has a boiling point at atmospheric pressure of less than 150° C., more preferably of less 98° C. and most preferably of less than 80° C.

Preferably, in the present method the carrier structure containing the distributed reactive polymer particles is heated to a temperature above the glass temperature of the water-soluble electrophilic polymer for at least 5 minutes. By heating the polymer particles in this way, the particles will become sticky and adhere to the fibrous carrier structure. Typically, the polymer particles are heated to a temperature of at least 40° C., more preferably of 50-80° C. for at least 15 minutes.

Alternatively, the reactive polymer particles can simply be adhered onto the fibrous carrier structure by exposing the fibrous carrier structure containing the distributed reactive polymer particles to a moist atmosphere to allow a fraction of the reactive electrophilic groups in the reactive polymer particles to react with the reactive nucleophilic groups in the aforementioned fibres.

The present method preferably comprises sterilisation of the haemostatic sheet. The haemostatic sheet may be sterilised prior to aseptic packaging. Alternatively, the sheet may be sterilised within a sealed packaging.

The invention is further illustrated by the following non-limiting examples.

EXAMPLES

In general: wherever residual moisture content (in dried powder, granulate and/or cohesive fibrous carrier structures) after drying is not explicitly mentioned, levels are below 2.0% w/w.

Preparation of NHS-POx

NHS-side chain activated poly[2-(ethyl/hydroxy-ethyl-amide-ethyl/NHS-ester-ethyl-ester-ethyl-amide-ethyl)-2-oxazoline]terpolymer containing 20% NHS-ester groups (=EL-POx, 20% NHS) was synthesized as follows: Poly[2-(ethyl/methoxy-carbonyl-ethyl)-2-oxazoline]copolymer (DP=+/−100) was synthesized by means of CROP using 60% 2-ethyl-2-oxazoline (EtOx) and 40% 2-methoxycarbonyl-ethyl-2-oxazoline (MestOx). A statistical copolymer containing 40% 2-methoxycarbonyl-ethyl groups ($^1$H-NMR) was obtained.

Secondly, the polymer containing 40% 2-methoxycarbonyl-ethyl groups, was reacted with ethanolamine yielding a copolymer with 40% 2-hydroxy-ethyl-amide-ethyl-groups ($^1$H-NMR). After that, half of the 2-hydroxy-ethyl-amide-ethyl-groups was reacted with succinic anhydride yielding a terpolymer with 60% 2-ethyl groups, 20% 2-hydroxy-ethyl-amide-ethyl-groups and 20% 2-carboxy-ethyl-ester-ethyl-amide-ethyl-groups according to $^1$H-NMR. Lastly, the 2-carboxy-ethyl-ester-ethyl-amide-ethyl-groups were activated by N-hydroxysuccinimide (NHS) and diisopropylcarbodiimide (DIC), yielding EL-POx, 20% NHS. The NHS-POx contained 20% NHS-ester groups according to $^1$H-NMR. NHS-POx was dissolved between 2-8° C. in water (60 g in 300 mL), cooled at minus 80° C. for half an hour and freeze dried. The freeze dried powder so obtained was dried in a Rotavap at 40° C. until the water content was below 0.8% w/w as determined via Karl Fischer titration. This dry (white) powder was grinded using a ball mill (Retch MM400) until the average particle size was not more than 40 μm (D [4,3]) and vacuum sealed in alu-alu bags.

Dying of NHS-POx Powder 20 g of NHS-POx powder were dissolved in water and mixed with 50 mg Brilliant Blue FCF (Sigma Aldrich) using a high-performance dispersing instrument (Ultra-Turrax, IKA). Directly after mixing (2 minutes) the solution was frozen at −78° C. and subsequently freeze dried overnight. The freeze dried powder so obtained was dried in a Rotavap at 40° C. until the residual water content was below 0.8% w/w as determined via Karl Fischer titration. Next, the dried (blue) powder was grinded using a ball mill (Retch MM400) until a blue dyed NHS-POx powder having an average particle size of not more than 40 μm (D [4,3]) and vacuum sealed in alu-alu bags.

Preparation of NU-POx

Polyoxazoline containing ethyl and amine groups in the alkyl side chain was synthesized by CROP of EtOx and MestOx and subsequent amidation of the methyl ester side chains with ethylene diamine to yield a poly(2-ethyl/ami-noethylamidoethyl-2-oxazoline) copolymer (NU-POx). The NU-POx contained 10% $NH_2$ according to $^1$H-NMR. NU-POx was dissolved between 2-8° C. in water (60 g in 300 mL), cooled at minus 80° C. for half an hour an freeze dried. The freeze dried powder so obtained was dried in a Rotavap at 40° C. until the water content was below 0.8% w/w as determined via Karl Fischer titration. This dry powder was grinded in a table top grinding machine until the average particle size was not more than 100 μm (D [4,3]) and vacuum sealed in alu-alu bags.

Preparation of Reactive NHS-POx/P188 Granules

P188 coated reactive NHS-POx granulates, containing 1.5, 2.5 or 3.5 wt. % Pluronic P188, were prepared by heating the NHS-POx together with P188 powder in a high shear mixer at 65° C. for 10 minutes followed by cooling down to ambient conditions. The coated granulate was grinded using a ball mill (Retch MM400) until the average particle size was not more than 40 μm (D [4,3]) and vacuum sealed in alu-alu bags.

The particle size distribution of the granulates so obtained was approximately: 90 vol. %<80 μm, 50 vol. %<40 μm and 10 vol. %<10 μm.

The NHS-POx/P188 (2.5%) granulate was analysed using $^1$H-NMR spectroscopy. 15 mg of granulate were dissolved in 1 mL of dimethylsulfoxide (DMSO-$d_6$). The solution was transferred to an NMR tube and a $^1$H-NMR spectrum was recorded. From the acquired spectrum, the amount of NHS bound to NHS-POx can be calculated. The amount of NHS bound to NHS-POx in the granulate was calculated to be 101 percent compared to NHS-POx starting material indicating no decay or cross linking during granulation.

The NHS-POx/P188 granulate was further analysed by means of size exclusion chromatography. 5 mg of the granulate dissolved in N,N-dimethylacetamide containing 50 mM lithium chloride (2.50 mL), which was the eluent for SEC analysis. SEC was measured against poly(methyl methacrylate) standards and from the obtained size exclusion chromatogram, the $M_n$, $M_w$ and PDI were determined. The PDI was not more than 1.5, indicating that no cross linking had occurred during granulation.

Preparation of Reactive NHS-POx/Carbonate Granules

A 1:1 mole/mole mixture of sodium carbonate and sodium hydrogen carbonate was prepared by dissolving 25.31 grams of sodium carbonate and 20.06 grams of sodium hydrogen carbonate in 350 mL ultrapure water, followed by flash freezing in liquid nitrogen and freeze drying. The resulting powder was dried under reduced pressure and vacuum sealed in an alu-alu bag.

25.28 grams of NHS-POx was mixed with 1.75 grams of the sodium carbonate/sodium hydrogen carbonate mixture and 0.80 mL isopropyl alcohol (IPA) using a high shear mixer until a homogeneous powder was obtained.

After mixing, the wet granulates were dried under reduced pressure until the IPA content was less than 0.1% w/w. The dried granulate was milled in a coffee grinder until the average particle size was not more than 25 μm, and vacuum sealed in alu-alu bags.

Preparation of Reactive NHS-POx/P188/Carbonate Granules

P188 coated reactive NHS-POx/carbonate granulates, containing 1.5, 2.5 or 3.5 wt. % Pluronic P188, were prepared by heating the NHS-POx/carbonate granulate together with P188 powder in a high shear mixer at 65° C. for 10 minutes followed by cooling down to ambient conditions. The coated granulate was grinded using a ball mill (Retch MM400) until the average particle size was not more than 40 μm (D [4,3]) and vacuum sealed in alu-alu bags.

The particle size distribution of the granulates so obtained was approximately: 90 vol. %<20 μm, 70 vol. %<10 μm and 40 vol. %<5 μm.

Preparation of Reactive NHS-POx/NU-POx Granules (IPA Granulation)

Blue or white (non-dyed) NHS-POx powder was wetted with isopropyl alcohol (IPA) in a high shear mixer until a homogeneous snow-like powder was obtained containing about 1-2% w/w IPA. After this, NU-POx powder was added and mixed. The wetted blue NHS-POx powder was mixed with NU-POx powder in a molar ratio of 1:0.6, said molar ratio referring to the ratio of the number of NHS groups provided by NHS-POx to the number of amine groups provided by the NU-POx. The wetted non-dyed NHS-POx powder was also mixed with NU-POx powder in other molar ratios (1:0.8; 1:1 and 1:1.2).

After mixing, the wet granulates were dried under reduced pressure until the IPA content was less than 0.1% w/w as determined via $^1$H-NMR. The dried granulates were grinded using a ball mill (Retch MM400) until the average particle size was not more than 50 μm (D [4,3]) and vacuum sealed in alu-alu bags.

The particle size distribution of the granulates so obtained was approximately: 90 vol. %<90 μm, 50 vol. %<45 μm and 10 vol. %<15 μm.

The NHS-PDX/NU-POx granulate (1:1) was analysed using $^1$H-NMR spectroscopy. 25 mg of granulate were dissolved in trifluoroacetic acid (0.20 mL) by sonicating for 20 minutes. After complete dissolution of the granulate, the sample was diluted with deuterated dimethylsulfoxide (DMSO-$d_6$) containing maleic acid (2.5 mg/mL) as an internal standard (0.80 mL), transferred to an NMR tube and a $^1$H-NMR spectrum was recorded.

From the acquired spectrum, the amount of NHS bound to NHS-POx can be calculated, along with the molar ratio of NHS and amine groups present in the granulate. The amount of NHS bound to NHS-POx in the granulate was equal to the amount of NHS bound to NHS-POx starting material indicating no decay or cross linking during granulation.

The total polymer recovery, i.e. the combination of NHS-POx and NU-POx, in the NMR sample was determined using a known amount of internal standard (maleic acid) and a calibration curve constructed from $^1$H-NMR spectra recorded of NHS-POx and NU-POx in different concentrations. The total polymer recovery was measured to be 99 percent, indicating that no insoluble crosslinked material was formed.

The NHS-PDX/NU-POx granulate (1:1) was further analysed by means of size exclusion chromatography. 20 mg of the granulate was treated with acetic anhydride (1.00 mL) for 1 hour at 50° C. Subsequently, methanol (2.00 mL) was added and the mixture was stirred for an additional hour at 50° C. An aliquot (0.75 mL) was taken and all volatiles were removed under reduced pressure. The sample was taken up in N,N-dimethylacetamide containing 50 mM lithium chloride (2.50 mL), which was the eluent for SEC analysis. SEC was measured against poly(methyl methacrylate) standards and from the obtained size exclusion chromatogram, the $M_n$, $M_w$ and PDI were determined. The PDI was not more than 1.5, indicating no cross linking had occurred during granulation. Analytical validation of this size exclusion chromatographic method indicated that intentional cross linking of NHS-POx with NU-POx at a level of 0.05 mol % increased the PDI to more than 2.5.

Preparation of Reactive NHS-POx/NU-POx Granules (Acetone Granulation)

Blue or white (non-dyed) NHS-POx powder was wetted with acetone in a high shear mixer until a homogeneous snow-like powder was obtained containing about 1-2% w/w acetone. After this, NU-POx powder was added and mixed. The wetted blue NHS-POx powder was mixed with NU-POx powder in a molar ratio of 1:0.20, said molar ratio referring to the ratio of the number of NHS groups provided by NHS-POx to the number of amine groups provided by the NU-POx. The wetted non-dyed NHS-POx powder was also mixed with NU-POx powder in other molar ratios (1:0.10 and 1:0.40).

After mixing, the wet granulates were dried under reduced pressure until the acetone content was less than 0.1% w/w as determined via $^1$H-NMR. The dried granulates were grinded using an Ultra Centrifugal Mill (Retch ZM200) and sieved over a test sieve with a Mesh size of 63 μm. The granulate fraction which passed through the sieve was collected and the average particle size was not more than 50 μm (D [4,3]). The granulate was vacuum sealed in alu-alu bags.

The particle size distribution of the granulates so obtained was approximately: 90 vol. %<90 μm, 50 vol. %<45 μm and 10 vol. %<15 μm.

The NHS-PDX/NU-POx granulate (1:0.20) was analysed using $^1$H-NMR spectroscopy. 25 mg of granulate were dissolved in trifluoroacetic acid (0.20 mL) by sonicating for 20 minutes. After complete dissolution of the granulate, the sample was diluted with deuterated dimethylsulfoxide (DMSO-d$_6$) containing maleic acid (2.5 mg/mL) as an internal standard (0.80 mL), transferred to an NMR tube and a $^1$H-NMR spectrum was recorded. From the acquired spectrum, the amount of NHS bound to NHS-POx can be calculated, along with the molar ratio of NHS and amine groups present in the granulate. The amount of NHS bound to NHS-POx in the granulate was equal to the amount of NHS bound to NHS-POx starting material indicating no decay or cross linking during granulation.

The total polymer recovery, i.e. the combination of NHS-POx and NU-POx, in the NMR sample was determined using a known amount of internal standard (maleic acid) and a calibration curve constructed from $^1$H-NMR spectra recorded of NHS-POx and NU-POx in different concentrations. The total polymer recovery was measured to be 99 percent, indicating that no insoluble crosslinked material was formed.

The NHS-PDX/NU-POx granulate (1:0.20) was further analysed by means of size exclusion chromatography. 20 mg of the granulate was treated with acetic anhydride (1.00 mL) for 1 hour at 50° C. Subsequently, methanol (2.00 mL) was added and the mixture was stirred for an additional hour at 50° C. An aliquot (0.75 mL) was taken and all volatiles were removed under reduced pressure. The sample was taken up in N,N-dimethylacetamide containing 50 mM lithium chloride (2.50 mL), which was the eluent for SEC analysis. SEC was measured against poly(methyl methacrylate) standards and from the obtained size exclusion chromatogram, the $M_n$, $M_w$ and PDI were determined. The PDI was not more than 1.5, indicating that no cross linking had occurred during granulation.

Preparation of Reactive NHS-POx/NU-POx/P188 Granules

Reactive NHS-POx/NU-POx granules were prepared as described previously. Subsequently, 2.5% w/w P188 coated reactive NHS-POx/NU-POx granulate was prepared by heating the NHS-POx/NU-POx granulate together with P188 powder in a high shear mixer at 65° C. for 10 minutes followed by cooling down to ambient conditions. The coated granulate was grinded using a ball mill (Retch MM400) until the average particle size was not more than 40 μm (D [4,3]) and vacuum sealed in alu-alu bags.

The particle size distribution of the granulates so obtained was approximately: 90 vol. %<80 μm, 50 vol. %<40 μm and 10 vol. %<10 μm.

The NHS-POx/NU-POx/P188 granulate was analysed using $^1$H-NMR spectroscopy. 25 mg of powder were dissolved in trifluoroacetic acid (0.20 mL) by sonicating for 20 minutes. After complete dissolution of the granulate, the sample was diluted with deuterated dimethylsulfoxide (DMSO-d$_6$) (0.80 mL), transferred to an NMR tube and a $^1$H-NMR spectrum was recorded. From the obtained spectrum, the amount of non-reacted NHS was calculated to be 98 percent compared to NHS-POx.

The NHS-POx/NU-POx/P188 granulate was further analysed by means of size exclusion chromatography. 20 mg of the granulate was treated with acetic anhydride (1.00 mL) for 1 hour at 50° C. Subsequently, methanol (2.00 mL) was added and the mixture was stirred for an additional hour at 50° C. An aliquot (0.75 mL) was taken and all volatiles were removed under reduced pressure. The sample was taken up in N,N-dimethylacetamide containing 50 mM lithium chloride (2.50 mL), which was the eluent for SEC analysis. SEC was measured against poly(methyl methacrylate) standards and from the obtained size exclusion chromatogram, the $M_n$, $M_w$ and PDI were determined. The PDI was not more than 1.5, indicating that no cross linking had occurred during granulation.

Preparation of reduced crosslinked gelatin (RXL)Reduced crosslinked gelatin (RXL) was prepared according to two procedures:

12 grams of gelatin powder (Gelita-SPON®, Gelita Medical GmbH) was dissolved in 350 mL of a 0.1 molar aqueous sodium hydroxide solution by stirring for 2 hours at 40° C. After a clear solution was obtained, the mixture was allowed to cool down to ambient temperature and the pH was adjusted to 7 by addition of 32.5 mL of a 1.0 molar aqueous hydrochloric acid solution. The solution was flash frozen using liquid nitrogen and freeze dried overnight. Subsequently, the powder was milled in a coffee grinder, dried under reduced pressure and vacuum sealed in an alu-alu bag. Hereafter, this reduced crosslinked gelatin will be referred to as RXL-LS (low salt).

12 grams of gelatin powder (Gelita-SPON®, Gelita Medical GmbH) was dissolved in 360 mL of a 1.0 molar aqueous sodium hydroxide solution by stirring for 10 minutes at 40° C. The obtained clear solution was cooled to ambient temperature and the pH was decreased to 7 by addition of 30 mL of a concentrated hydrochloric acid solution (37% w/w).

The solution was flash frozen using liquid nitrogen and freeze dried overnight. Subsequently, the powder was milled in a coffee grinder, dried under reduced pressure and vacuum sealed in an alu-alu bag. Hereafter, this reduced crosslinked gelatin will be referred to as RXL-HS (high salt).

Preparation of Reactive NHS-POx/RXL Granules (Low Salt and High Salt)

NHS-POx/RXL reactive granules were prepared as follows: 5 g of blue NHS-POx powder were wetted with IPA in a high shear mixer until a homogeneous snow like powder was obtained containing about 1-2% w/w IPA. After this, 5 g of RXL-LS or RXL-HS powder were added and mixed. After mixing, the wet granulates were dried under reduced pressure until the IPA content was less than 0.1% w/w as determined via $^1$H-NMR. The dried granulates were milled in a coffee grinder until the average particle size was not more than 90 μm (D [4,3]) and vacuum sealed in alu-alu bags.

The particle size distribution of the granulates so obtained was approximately: 90 vol. %<190 μm, 50 vol. %<60 μm and 10 vol. %<15 μm.

The granulate containing RXL was analysed by means of $^1$H-NMR spectroscopy analysis. To this end deuterated chloroform (CDCl3) containing 5% (v/v) acetic acid (1.0 mL) was added to 25 mg of the granulate. NHS-POx was selectively extracted by sonicating the sample for 20 minutes. The dispersion was passed through a 0.22 μm filter, transferred to an NMR tube and a $^1$H-NMR spectrum was recorded. From the obtained spectrum, the amount of non-reacted NHS was calculated to be 98 percent compared to NHS-POx.

The recovery of NHS-POx in the NMR sample was determined using trimethylsilane as an internal standard and a calibration curve constructed from $^1$H-NMR spectra of NHS-POx in different concentrations. The total NHS-POx recovery was measured to be 100 percent, indicating that no insoluble crosslinked material was formed.

The NHS-POx/RXL granulate was further analysed by means of size exclusion chromatography. Therefore, an aliquot (0.15 mL) was taken from the solution used for $^1$H-NMR spectroscopy analysis. This solution was diluted with N,N-dimethylacetamide containing 50 mM lithium chloride (1.00 mL), which was the eluent for SEC analysis. SEC was measured against poly(methyl methacrylate) standards and from the obtained size exclusion chromatogram, the $M_n$, $M_w$ and PDI were determined. The PDI was not more than 1.5, again indicating that no cross linking had occurred during granulation.

Preparation of Reactive NHS-POx/RXL Granules Containing Carbonate

First, a 1:1 mole/mole mixture of sodium carbonate and sodium hydrogen carbonate was prepared by dissolving 25.31 g of sodium carbonate and 20.06 g of sodium hydrogen carbonate in 350 mL ultrapure water. The solution was flash frozen in liquid nitrogen and freeze dried. The resulting powder was dried under reduced pressure and vacuum sealed in an alu-alu bag.

The NHS-POx/RXL/carbonate granulates were prepared as follows: 5 g of RXL-LS or RXL-HS and 0.178 g of the sodium carbonate/sodium hydrogen carbonate were mixed using a high shear mixer. Next, 5 g of blue NHS-POx were added containing about 1-2% w/w IPA and mixed until a homogeneous powder was obtained. After mixing, the wet granulates were dried under reduced pressure until the IPA content was less than 0.1% w/w as determined via $^1$H-NMR. The dried granulates were milled in a coffee grinder until the average particle size was not more than 100 μm (D [4,3]) and vacuum sealed in alu-alu bags.

Preparation of Reactive NHS-POx/NH2-PEG Granules

NHS-POx (6.9 g) was wetted with IPA in a high shear mixer until a homogeneous snow-like powder was obtained containing about 1-2% w/w IPA. Subsequently, 8.1 g of amine-PEG-amine, 2-arm, MW 2k (ex Creative PEGWorks) were added (molar ratio of 1:1.16, said molar ratio referring to the ratio of the number of NHS groups provided by NHS-POx to the number of amine groups provided by the PEG-amine). The formed granulate was dried under reduced pressure until the IPA content was less than 0.1% w/w as determined via $^1$H-NMR. The dried granulate was milled in a coffee grinder until the average particle size was not more than 100 μm (D [4,3]) and vacuum sealed in alu-alu bags.

The NHS-PDX/NH2-PEG granulate was analysed using $^1$H-NMR spectroscopy. 25 mg of granulate were dissolved in trifluoroacetic acid (0.20 mL) by sonicating for 20 minutes. After complete dissolution of the granulate, the sample was diluted with deuterated dimethylsulfoxide (DMSO-$d_6$) (0.80 mL), transferred to an NMR tube and a $^1$H-NMR spectrum was recorded. From the obtained spectrum, the amount of non-reacted NHS was calculated to be 97 percent compared to NHS-POx.

The NHS-PDX/NH2-PEG granulate was further analysed by means of size exclusion chromatography. 20 mg of the granulate was treated with acetic anhydride (1.00 mL) for 1 hour at 50° C. Subsequently, methanol (2.00 mL) was added and the mixture was stirred for an additional hour at 50° C. An aliquot (0.75 mL) was taken and all volatiles were removed under reduced pressure.

The sample was taken up in N,N-dimethylacetamide containing 50 mM lithium chloride (2.50 mL), which was the eluent for SEC analysis. SEC was measured against poly(methyl methacrylate) standards and from the obtained size exclusion chromatogram, the $M_n$, $M_w$ and PDI were determined. The PDI was not more than 1.5, indicating that no cross linking occurred during granulation.

Preparation of Reactive NHS-PEG/NU-POx Granules 1.07 grams of NHS-PEG 4-arm MW 10k (ex Creative PEGWorks) and 0.46 grams of NU-POx were thoroughly mixed using a pestle and mortar with 50 uL diethyl ether. After formation of a homogeneous mixture, it was dried under reduced pressure and vacuum sealed in an alu-alu bag.

Preparation of Reactive NHS-POx/Gelita Spon Granules 7.01 g of pre-dried gelatin powder (Gelita-SPON®, ex Gelita Medical GmbH), having a water content of less than 0.2% w/w, was dispersed in dichloromethane (200 mL) using a high shear mixer operating at 20,000 rpm for 20 minutes. Subsequently, NHS-POx (7.02 g) was added and the stirring was continued for 5 minutes. NHS-POx did not dissolve. All volatiles were removed from the suspension under reduced pressure. The obtained powder was milled using a coffee grinder until the average particle size was not more than 95 μm (D [4,3]) and vacuum sealed in alu-alu bags, further dried under reduced pressure and vacuum sealed in an alu-alu bag.

The particle size distribution of the granulates so obtained was approximately: 90 vol. %<190 µm, 50 vol. %<80 µm and 10 vol. %<15 µm.

The granulate was analysed by means of $^1$H-NMR spectroscopy analysis. To this end deuterated chloroform (CDCl$_3$) containing 5% (v/v) acetic acid (1.0 mL) was added to 25 mg of the granulate. NHS-POx was selectively extracted by sonicating the sample for 20 minutes. The dispersion was passed through a 0.22 µm filter, transferred to an NMR tube and a $^1$H-NMR spectrum was recorded. From the obtained spectrum, the amount of non-reacted NHS was calculated to be 97 percent compared to NHS-POx.

The granulate was further analysed by means of size exclusion chromatography (SEC) analysis. An aliquot (0.15 mL) of the filtered NHS-POx extract described above was diluted with N,N-dimethylacetamide containing 50 mM lithium chloride (1.00 mL), which was the eluent for SEC analysis.

The sample was analysed by SEC against poly(methyl methacrylate) standards and the PDI was 1.45 indicating that no cross linking had occurred.

Cohesive Fibrous Carrier Structure

The following commercially available haemostatic product was selected to be used as fibrous carrier structures in the preparation of tissue-adhesive sheets according to the present invention:

Gelita Tuft-It®: A cohesive fibrous carrier structure consisting of eight layers of reduced cross-linked gelfoam fibres. The eight layers, of each about 2 mm thickness, have dimensions of 50 mm by 75 mm. The water content of Gelita Tuft-It® is not more than 15%. The product was dried in a vacuum oven for several hours at 40° C. to reduce the water content to not more than 2.0% w/w (determined gravimetrically), before it was impregnated with agglomerate particles.

Bleeding Experiments

Standardized ex-vivo and in-vivo porcine bleeding models were used to assess haemostatic efficacy. All models use heparin to increase clotting time of blood to about 2 to 3 times activated coagulation time (ACT).

Ex-vivo model: live ex-vivo pig model with a fresh liver, perfused with heparinized fresh blood from the slaughterhouse to mimic real in-vivo situations a closely as possible. Livers are mounted onto a perfusion machine by which oxygenation, pH of blood, temperature and blood pressure are kept within vivo boundaries. Two livers and 10 litres of heparinized blood (5000 units/L) are collected at the slaughterhouse. Livers are transported on ice; blood at ambient temperature. Within two hours after collection, livers are inspected for lesions which are closed with gloves and cyanoacrylate glue.

Perfusion parameters: flow 600 ml/min; pressure 10-12 mmHg; temperature 37° C. (+/−1° C.); carbogen 0.25 litres a minute With a flat, round, rotating abrasion tool a circular bleeding wound (8 mm diameter) is created on the liver surface, with a rubber onlay so that the depth of the punched bleeding is always 3 mm After the liver is perfused properly (colour and temperature checked) samples are tested according to the following procedure: cut sample to the right size (2.7 by 2.7 cm); camera on; site number on camera; biopsy punch 8 mm; cut away biopt; remove blood from bleeding with gauze (2×); collect blood for 30 sec in pre-weight gauze; score bleeding (by 2 researchers); put sample on bleeding by a pre-wetted gauze (saline) and hold with little pressure for 1 min; observe for 5 min (check and score adhesion and haemostasis) and repeat after 30 minutes.

In-vivo model: standardized combined penetrating spleen rupture is inflicted in anesthetized swine (Domestic Pig, Male, Body Weight Range: 40 kg, Adult). A midline laparotomy is performed to access the spleen and other organs. Using a scalpel, n=3 (S1 . . . S3) subcapsular standardized lesions (10 mm×10 mm) are made. The haemostatic products are applied with gentle pressure by a pre-wetted gauze (saline) and held for 1 min. After application of the product the time to haemostasis (TTH) is assessed. If TTH equals zero, this means that after 1 minute pressure haemostasis had already been achieved.

Scoring System for Patches: Coagulation

| | |
|---|---|
| ++++ | Achieved immediately after tamponade |
| +++ | Achieved <10 seconds after tamponade |
| ++ | Achieved <30 seconds after tamponade |
| + | Achieved within 3 minutes after tamponade |
| +/− | Achieved after 3 minutes, second tamponade applied |
| − | Not achieved |

Scoring System for Patches: Adhesion 10 Minutes after Application

| | |
|---|---|
| ++++ | Very strong adhesion (patch breaks when being removed) |
| +++ | Strong adhesion (patch breaks when being removed) |
| ++ | Strong adhesion (patch can be removed without breaking) |
| + | Moderate adhesion (patch can be removed without breaking) |
| +/− | Mild adhesion (patch can be removed without breaking) |
| − | Not achieved |

Example 1

Impregnation of Carrier Structures with Dyed Polymer Particles

A Vibratory Sieve Shaker AS 300 (Retsch) was operated for two consecutive periods of 5 minutes each to introduce the dyed NHS-POx powder into different carrier structures. After production, haemostatic patches were packed in alu-alu pouches containing 1 g of silica and vacuum sealed.

Using the above mentioned shaking machine, blue NHS-POx powder was introduced into three different carrier structures:

gelatin foam (Gelita Rapid®, Gelita Medical Germany), a sponge collagen foam (Surgicoll®, MBP, Germany), a sponge fibrous carrier structure (Gelita Tuft-It®, Gelita Medical Germany))

It was found that after the shaking treatment, the blue NHS-POx powder had hardly penetrated the gelatin foam or collagen foam. After cutting the foam with a scalpel it was clear that there was no depth impregnation.

In contrast thereto, the shaking treatment had homogenously dispersed the blue NHS-POx powder throughout the fibrous carrier structure.

Example 2

Impregnation of Carriers Structure with Reactive Polymer Particles and Granulate Gelita Tuft-It® (appr. 0.71 grams) was impregnated via the mechanical shaking process with NHS-POx powder and NHS-POx/NU-POx (1:0.6) granulate, respectively. A paint shaking machine was used (VIBA PRO V of Collomix GmbH) to introduce the dyed powders (appr. 0.75 grams) into the patch. The array with the carrier structures holder was clamped in the machine. The array was vibrated vertically.

The impregnated samples were put on a PMMA plate and placed in an oven in which samples were subjected to different heat treatments. To evaluate powder fixation, samples were ticked twice on the white PMMA plate. If no blue powder was released, the outcome was regarded as fixated. The results are shown in Table 1.

TABLE 1

| Temperature (° C.) | Time (min) | Fixation |
|---|---|---|
| 70 | 15 | no fixation |
| 70 | 30 | no fixation |
| 70 | 60 | no fixation |
| 70 | 300 | no fixation |
| 75 | 15 | semi fixation |
| 75 | 30 | semi fixation |
| 80 | 15 | fixation |
| 80 | 30 | fixation |
| 85 | 15 | fixation |

No differences in fixation outcome were observed between the samples impregnated with NHS-POx powder and the samples impregnated with NHS-POx/NU-POx granulate Both the reactive NHS-POx powder and the NHS-POx/NU-POx granulate are hygroscopic. At ambient temperature and relative humidity (RH) lower than 40% fibrous carrier structures can be impregnated within half an hour of exposure, reproducibly. However, if impregnation is performed at, for instance, RH 75% and 25° C. the particles/granules get sticky within minutes, leading to non-reproducible, inhomogeneous impregnation characteristics.

Example 3

Hemostatic patches (Gelita Tuft-It®; 50×75 mm, appr. 0.7 grams) were impregnated with 1 g of blue NHS-POx by shaking them in a sprung suspension moved by a pneumatic shaking engine of the "rattling" type. The engine was a NTP 25 B+C (Netter Vibration GmbH) operated at 6 bar, 146 Hz and 830N centrifugal force. Ten cycles of each ten seconds were used to disperse the dyed NHS-POx powder. After production, hemostatic patches were packed in alu-alu pouches containing 1 g of silica and vacuum sealed.

Patches were cut into 2 cm×2 cm pieces and tested in triplicate in the ex vivo liver perfused model. Time to hemostasis (TTH) was 0 minutes (after 1-minute pressure) and no re-bleeding was observed during the 30 minutes observation time. The patches showed very good adhesive properties. It was not possible to remove the patches without breaking it into pieces. In addition, the patch was found to have great flexibility and bending properties.

The patches were also evaluated in the in vivo porcine heparinized model. They were found to provide high hemostatic efficacy and to have excellent adhesive properties. Active bleedings were efficiently stopped in resections of various organs: spleen, liver and kidney. A summary of the ex-vivo and in-vivo results is shown in Table 2.

TABLE 2

| | Ex-vivo | | In-vivo | |
|---|---|---|---|---|
| Organ | Hemostatic capacity | Adhesive properties | Hemostatic capacity | Adhesive properties |
| Liver | +++ | +++ | +++ | +++ |
| Spleen | NA | NA | +++ | +++ |
| Kidney | NA | NA | +++ | ++ |

Example 4

Hemostatic patches (Gelita Tuft-IM; 50×75 mm, appr. 0.71 grams) were impregnated with the reactive NHS-POx/NU-POx (1:0.6) granulate previously described. One gram of the granulate was distributed throughout the patches as described in Example 3. Next, the hemostatic patches were packed in alu-alu pouches containing 1 g of silica and vacuum sealed.

Patches were cut into 2 cm×2 cm pieces and tested in triplicate in the ex vivo liver perfused model. Time to haemostasis (TTH) was 0 (after 1 minute pressure) and no re-bleeding was observed during the 30 minutes observation time. The patch was also found to have great flexibility and bending properties.

The patches were also evaluated in the in vivo porcine heparinized model. They were found to have very good coagulation and adhesive properties. Active bleedings were efficiently stopped in resections of various organs: spleen, liver and kidney. A summary of the results is shown in Table 3.

TABLE 3

| | Ex-vivo | | In-vivo | |
|---|---|---|---|---|
| Organ | Hemostatic capacity | Adhesive properties | Hemostatic capacity | Adhesive properties |
| Liver | ++++ | +++ | ++++ | +++ |
| Spleen | NA | NA | ++++ | +++ |
| Kidney | NA | NA | ++++ | +++ |

Example 5

Gelita Tuft-It® (50×75 mm, appr. 0.7 g) was impregnated with different reactive polymer powders. The haemostatic properties of the patches so obtained were tested in the ex-vivo and in-vivo porcine bleeding models described herein before.

The fibrous carrier structure was impregnated with 1.4 g of powder using a pneumatic shaking device. The sheet of fibrous carrier was vibrated vertically. The engine of the long stroke type (NTK 25 AL L, ex Netter Vibration GmbH) was operated at 6 bar, 11 Hz and an amplitude of 30 mm. Four cycles of 15 seconds were used to disperse the powder into the sheet. The granulates were distributed through the complete thickness of the sheets. Also the distribution over the surface of the sheets was homogeneous.

Nine different reactive polymer powders were tested. These powders contained a water-soluble polymer carrying reactive electrophilic groups in the form of NHS-POx or in the form of pentaerythritol poly(ethyleneglycol)ether tetra-succinimidyl glutarate (NHS-PEG), ex NOF America corporation. Some of the reactive polymer powders were granulates that, besides NHS-POx or NHS-PEG, contained a polymer carrying reactive nucleophilic groups that are capable of reacting with the reactive NHS-groups of the NHS-POx and NHS-PEG. The preparation of these granulates has been described herein before.

The granulates that were tested are listed below:
NHS-POx/P188
NHS-POx/carbonate
NHS-POx/Gelita Spon
NHS-POx/NH2-PEG
NHS-POx/RXL (high salt)
NHS-POx/RXL (low salt)
NHS-POx/RXL (high salt) containing carbonate
NHS-PEG/RXL (low salt)
NHS-PEG/NU-POx The different combinations of fibrous carrier structure and reactive polymer powders that were tested are shown in Table 4.

TABLE 4

| Patch | Electrophilic polymer | Nucleophilic polymer | Carbonate | Pluronic P188 |
|---|---|---|---|---|
| 1 | NHS-POx | | | X |
| 2 | NHS-POx | | X | |
| 3 | NHS-POx | Gelita Spon | | |
| 4 | NHS-POx | NH$_2$-PEG | | |
| 5 | NHS-POx | RXL-HS | | |
| 6 | NHS-POx | RXL-LS | | |
| 7 | NHS-POx | RXL-HS | X | |
| 8 | NHS-PEG | RXL-LS | | |
| 9 | NHS-PEG | NU-POx | | |

The results obtained with these patches in the ex-vivo and in-vivo porcine bleeding models are summarised in Table 5.

TABLE 5

| | Ex vivo | | In vivo | |
|---|---|---|---|---|
| Patch | Coagulation | Adhesion | Coagulation | Adhesion |
| 1 | +++ | +++ | +++ | +++ |
| 2 | +++ | +++ | +++ | +++ |
| 3 | ++++ | ++ | ++++ | ++ |
| 4 | n.a. | n.a. | + | + |
| 5 | n.a. | n.a. | + | + |
| 6 | n.a. | n.a. | + | + |
| 7 | n.a. | n.a. | + | + |
| 8 | n.a. | n.a. | + | + |
| 9 | n.a. | n.a. | ++ | + |

Example 6

Hemostatic patches (Gelita Tuft-IM; 50×75 mm, appr. 0.7 g) were impregnated with NHS-POx/NU-POx/P188 2.5%. One gram of the granulate was distributed throughout the patches as described in Example 2. Next, the hemostatic patches were packed in alu-alu pouches containing 1 g of silica and vacuum sealed.

The patches were evaluated in the in vivo porcine heparinized model. They were found to have very good coagulation and sufficient adhesive properties—the reduced adhesive properties enabled the patch to be removed in one piece as opposed to identical patches that did not include P188. Active bleedings were efficiently stopped in resections of various organs: spleen, liver and kidney. A summary of the results is shown in Table 6.

TABLE 6

| | In-vivo | |
|---|---|---|
| Organ | Coagulation | Adhesive properties |
| Liver | ++++ | ++ |
| Spleen | ++++ | ++ |
| Kidney | ++++ | ++ |

Example 7

Hemostatic patches (Gelita Tuft-IM; 50×75 mm, appr. 0.7 g) were impregnated with NHS-POx/NU-POx or with NHS-POx/NU-POx/P188 containing 1.5%, 2.5% or 3.5% Pluronic P188, respectively. One gram of the granulate was distributed throughout the patches as described in Example 2. Next, the hemostatic patches were packed in alu-alu pouches containing 1 g of silica and vacuum sealed.

The patches were evaluated in the in vivo porcine heparinized model on spleen resections (arterial bleeding). The results is summarised in Table 7.

TABLE 7

| | In-vivo | |
|---|---|---|
| % P188 | Coagulation | Adhesive properties |
| 0 | +++ | ++++ |
| 1.5 | +++ | +++ |
| 2.5 | +++ | ++ |
| 3.5 | +++ | ++ |

The patches containing NHS-POx/NU-POx/P188 were easier to remove after application as "one piece" than the patches containing NHS-POx/NU-POx.

Example 8

Experiments were conducted to determine the effect of NU-POx content of the reactive NHS-POx/NU-POx granulate on in-vivo performance of the haemostatic patch.

Method of Impregnation

Hemostatic patches (Gelita Tuft-IM; 50×75 mm, appr. 0.7 g) were impregnated with reactive NHS-POx/NU-POx granules made via acetone granulation in molar ratios of 1:0.10, 1:0.20 and 1:0.40, said molar ratio referring to the ratio of the number of NHS groups provided by NHS-POx to the number of amine groups provided by the NU-POx. The same hemostatic patches were also impregnated with reactive NHS-POx powder.

One gram of the granulate/powder was distributed throughout the patches using the Fibroline SL-Preg laboratory machine. Next, the hemostatic patches were fixated, dried and packed in alu-alu pouches containing 1 g of silica and vacuum sealed.

Machine

The Fibroline SL-Preg laboratory machine moves particles between electrodes by applying voltages up to 40 kV at frequencies of up to 200 Hz for a period of up to 60 seconds. The two electrode plates have a size of about 50×40 cm. The top plate is grounded.

The following standard settings were used: 40 kV, 100 Hz, 20 seconds.

Arrays

Powders were dosed gravimetrically into a 3D printed PMMA array after the array had been mounted onto the bottom electrode plate. The array was filled with reactive polymer powders using a scraping carton or metal spatula. The array measured 50×75×4 mm and contained 22×33=726 square wells (inner dimensions of each well: 2×2×2 mm). The combined volume of the 726 wells was approximately 5.8 mL.

Spacer

A spacer mask was placed on top of the array. The spacer was used to allow particles to move up and down when subjected to the alternating electric field. If no spacer is used, penetration and distribution through the carrier is limited. For TUFT-IT this was a mask of 3 mm. This results in 3+4 mm=7 mm distance of the electrodes.

The in vivo performance of haemostatic patches containing NHS-POx:NU-POx granulate (0, 10, 20 and 40 percent amine groups from NU-POx, the percentage being calculated on the basis of the number of NHS groups provided by the NHS-POx) or NHS-POx powder was evaluated in a-non heparinised in-vivo porcine model. The details of the patches that were tested are shown in Table 8.

TABLE 8

| Patch | Molar % amine | NHS-POx:NU-POx (g/g) | Grams of granulate in patch |
|---|---|---|---|
| 1 | 10 | 1:0.12 | 1 |
| 2 | 20 | 1:0.25 | 1 |
| 3 | 40 | 1:0.48 | 1 |
| 4 | 0 | 1:0 | 1 |

In Vivo Tests

Tests were carried out on adult female domestic pigs (40-50 kg) No anticoagulation agent was applied. Patch performance was tested on both spleen and liver. The spleen or liver were located and externalized as needed as the testing period progressed and their natural humidity was kept by covering them with saline soaked sponges.

Different types of injuries were created:

Liver: Abrasions, biopsy punches and resections

Spleen: Resections

An appropriately sized section of the liver parenchyma was abraded/punched to cause moderate to severe bleeding. The liver abrasions were created by surgical scalpel and a template of 1×1 cm2 and the circular punches using a 8 mm circular biopsy punch. Liver and spleen resections were created using a surgical knife.

The patch was applied immediately after the tissue resection or scarification:

2×2 cm pieces for the biopsy punches and abrasions

Complete 7.5×5 cm patch for resections

The tested patches were applied on the bleeding tissue and gently pressed down by compression using a pre-wet gauze with saline solution. Tamponade was applied for an initial period of 10 seconds followed by subsequent 30 seconds intervals up to a total of 5 minutes.

A TUFT-IT patch that had not been impregnated was used as a reference (referred to as TUFT-IT).

The results of the in vivo tests are summarised in Table 9.

TABLE 9

| | Average time to haemostasis (in seconds) | | | |
|---|---|---|---|---|
| | Liver abrasion | Liver punch | Liver resection | Spleen resection |
| Patch 1 | 10 | 10 | 10 | 10 |
| Patch 2 | 10 | 10 | 10 | 10 |
| Patch 3 | 10 | 10 | 10 | 80 |
| Patch 4 | 10 | 80 | 75 | 165 |
| TUFT-IT | 135 | 165 | 210 | 225 |

Patches 1 to 4 showed very strong tissue adhesion, whereas only mild adhesion was observed for the TUFT-IT patch.

Patches 1 and 2 showed no more than very limited swelling after application. Patches 3 to 4 showed more, but still acceptable, swelling.

Example 9

Hemostatic patches (Gelita Tuft-IM; 50×75 mm, appr. 0.7 g) were impregnated with either a solution of NHS-POx, NHS-POx powder or NHS-POx/NU-POx granulate. The NHS-POx/NU-POx granulate used was made via acetone granulation in a molar ratio of 1:0.20 (see Example 8).

A spraying solution containing NHS-POx was prepared by dissolving NHS-POx in a 1:1 mixture of isopropyl alcohol and dichloromethane (200 g/L). The patches were impregnated with 5 mL of this spraying solution using a glass laboratory sprayer and pressurized air in a single spraying cycle. The total amount of NHS-POx delivered in this way was 1 gram per patch. After impregnation the patches were allowed to dry inside an oven at 40° C. for 2 hours, following which they were stored in a desiccator for 2 days before being packing in alu-alu pouches containing 1 g of silica and vacuum sealing.

In addition, patches were impregnated with 1 gram of NHS-POx powder or 1 gram of the NHS-POx/NU-POx granulate using the procedure described in Example 8.

The performance of the patches so prepared was tested in triplicate in the ex vivo liver perfused model under mild (<20 mL/min) and severe bleeding (>50 mL/min) conditions. With a flat, round, rotating abrasion tool a circular bleeding wound (8 mm diameter) was created on the liver surface, with a rubber onlay so that the depth of the punched bleeding was always 3 mm. The results are shown in Table 10.

TABLE 10

| | Ex-vivo | | | |
|---|---|---|---|---|
| | Mild bleeding | | Severe bleeding | |
| Type of impregnation | Hemostatic capacity | Adhesive properties | Hemostatic capacity | Adhesive properties |
| NHS-POx/NU-POx granulate | ++++ | ++++ | ++++ | ++++ |
| NHS-POx powder | +++ | ++++ | + | ++++ |
| NHS-POx solution | − | +/− | not tested | not tested |

The invention claimed is:

1. A biocompatible, flexible, haemostatic sheet comprising:
   (a) a water-resistant cohesive fibrous carrier structure comprising a three-dimensional interconnected interstitial space and fibres comprising a nucleophilic polymer carrying reactive nucleophilic groups; and
   (b) distributed within the interstitial space throughout the fibrous carrier structure, a plurality of reactive polymer particles comprising a water-soluble electrophilic polymer carrying at least three reactive electrophilic groups that are capable of reacting with both amine groups in tissue and blood and with the reactive nucleophilic groups of the nucleophilic polymer to form covalent bonds,
   wherein the reactive polymer particles have a diameter between 0.5-100 μm and are present in an amount of at least 3% by weight of the fibrous carrier structure.

2. The biocompatible, flexible, haemostatic sheet according to claim 1, wherein the fibres in the fibrous carrier structure have a mean diameter of 1-500 μm.

3. The biocompatible, flexible, haemostatic sheet according to claim 1, wherein the fibrous carrier structure is a felt structure, a woven structure or a knitted structure.

4. The biocompatible, flexible, haemostatic sheet according to claim 3, wherein the fibrous carrier structure is a felt structure.

5. The biocompatible, flexible, haemostatic sheet according to claim 1, wherein the water-soluble electrophilic polymer is selected from the group consisting of polyoxazolines, polyethylene glycols, polyvinylpyrrolidones, polyurethanes and combinations thereof.

6. The biocompatible, flexible, haemostatic sheet according to claim 5, wherein the water-soluble electrophilic polymer is a polyoxazoline.

7. The biocompatible, flexible, haemostatic sheet according to claim 1, wherein the reactive electrophilic groups are selected from the group consisting of carboxylic acid esters, sulfonate esters, phosphonate esters, pentafluorophenyl esters, p-nitrophenyl esters, p-nitrothiophenyl esters, acid halide groups, anhydrides, ketones, aldehydes, isocyanato, thioisocyanato, isocyano, epoxides, activated hydroxyl groups, olefins, glycidyl ethers, carboxyl, succinimidyl esters, sulfo succinimidyl esters, maleimido (maleimidyl), ethenesulfonyl, imido esters, aceto acetate, halo acetal, orthopyridyl disulfide, dihydroxy-phenyl derivatives, vinyl, acrylate, acrylamide, iodoacetamide and combinations thereof.

8. The biocompatible, flexible, haemostatic sheet according to claim 1, wherein the reactive polymer particles comprise at least 10 wt. % of the water-soluble electrophilic polymer.

9. The biocompatible, flexible, haemostatic sheet according to claim 1, wherein the reactive polymer particles are particle agglomerates comprising: (i) electrophilic particles comprising the water-soluble electrophilic polymer; and (ii) nucleophilic particles comprising the nucleophilic cross-linking agent.

10. The biocompatible, flexible, haemostatic sheet according to claim 9, wherein the electrophilic particles comprise at least 30 wt. % of the water-soluble electrophilic polymer.

11. The biocompatible, flexible, haemostatic sheet according to claim 10, wherein the electrophilic particles comprise at least 50 wt. % of the water-soluble electrophilic polymer.

12. The biocompatible, flexible, haemostatic sheet according to claim 11, wherein the electrophilic particles comprise at least 80 wt. % of the water-soluble electrophilic polymer.

13. The biocompatible, flexible, haemostatic sheet according to claim 9, wherein the nucleophilic particles comprise at least 30 wt. % of the nucleophilic cross-linking agent.

14. The biocompatible, flexible, haemostatic sheet according to claim 13, wherein the nucleophilic particles comprise at least 50 wt. % of the nucleophilic cross-linking agent.

15. The biocompatible, flexible, haemostatic sheet according to claim 14, wherein the nucleophilic particles comprise at least 80 wt. % of the nucleophilic cross-linking agent.

16. The biocompatible, flexible, haemostatic sheet according to claim 9, wherein the reactive polymer particles have the following composition:
   (i) 50-95 wt. % water-soluble electrophilic polymer carrying at least three reactive electrophilic groups;
   (ii) 5-50 wt. % nucleophilic cross-linking agent;
   (iii) 0-50 wt. % polysaccharide;
   wherein the combination of components (i) to (iii) together constitute at least 80 wt. % of the reactive polymer particles.

17. The biocompatible, flexible, haemostatic sheet according to claim 16, wherein the combination of components (i) to (iii) together constitute at least 90 wt. % of the reactive polymer particles.

18. The biocompatible, flexible, haemostatic sheet according to claim 9, wherein the reactive polymer particles comprise the water-soluble electrophilic polymer and the nucleophilic cross-linking agent in such amounts that the ratio between the total number of reactive electrophilic groups provided by the water-soluble electrophilic polymer and the total number of reactive nucleophilic groups provided by the nucleophilic cross-linking agent is in the range of 25:1 to 1:1.

19. The biocompatible, flexible, haemostatic sheet according to claim 18, wherein the reactive polymer particles comprise the water-soluble electrophilic polymer and the nucleophilic cross-linking agent in such amounts that the ratio between the total number of reactive electrophilic groups provided by the water-soluble electrophilic polymer and the total number of reactive nucleophilic groups provided by the nucleophilic cross-linking agent is in the range of 18:1 to 2:1.

20. The biocompatible, flexible, haemostatic sheet according to claim 19, wherein the reactive polymer particles comprise the water-soluble electrophilic polymer and the nucleophilic cross-linking agent in such amounts that the ratio between the total number of reactive electrophilic groups provided by the water-soluble electrophilic polymer and the total number of reactive nucleophilic groups provided by the nucleophilic cross-linking agent is in the range of 12:1 to 2.5:1.

21. The biocompatible, flexible, haemostatic sheet according to claim 1, wherein the nucleophilic polymer is selected from the group consisting of protein, chitosan, synthetic polymers carrying reactive nucleophilic group, carbohydrate polymers carrying reactive nucleophilic groups and combinations thereof.

22. The biocompatible, flexible, haemostatic sheet according to claim 21, wherein the nucleophilic polymer is gelatin, collagen, chitosan or combinations thereof.

23. The biocompatible, flexible, haemostatic sheet according to claim 22, wherein the nucleophilic polymer is gelatin.

24. The biocompatible, flexible, haemostatic sheet according to claim 23, wherein the gelatin is cross-linked.

25. The biocompatible, flexible, haemostatic sheet according to claim 1, wherein the fibrous carrier structure comprises at least 50 wt. % of the nucleophilic polymer.

26. The biocompatible, flexible, haemostatic sheet according to claim 1, wherein the sheet has a non-compressed density of 25-200 mg/cm$^3$.

27. A sealed package comprising one or more biocompatible, flexible, haemostatic sheets according to claim 1.

28. A method of preparing the biocompatible, flexible, haemostatic sheet according to claim 1, the method comprising:
(a) providing a sheet of water-resistant cohesive fibrous carrier structure comprising a three-dimensional interconnected interstitial space and fibres comprising a nucleophilic polymer carrying reactive nucleophilic groups;
(b) providing reactive polymer particles comprising a water-soluble electrophilic polymer carrying at least three reactive electrophilic groups that are capable of reacting with both amine groups in tissue and blood and with the reactive nucleophilic groups of the nucleophilic polymer to form covalent bonds, wherein the reactive polymer particles have a diameter between 0.5-100 μm; and (c) distributing the reactive polymer particles within the interstitial space throughout the fibrous carrier structure in an amount of at least 3% by weight of the fibrous carrier structure.

29. The method according to claim 28, comprising exposing the fibrous carrier structure comprising the distributed reactive polymer particles to a moist atmosphere to react the reactive nucleophilic groups in the aforementioned fibres with the reactive electrophilic groups in the reactive polymer particles.

* * * * *